(12) United States Patent
Alig et al.

(10) Patent No.: US 11,083,131 B2
(45) Date of Patent: *Aug. 10, 2021

(54) METHOD AND APPARATUS FOR APPLYING LIQUID NUTRIENTS BETWEEN PARALLEL ROWS OF STANDING CROPS

(71) Applicant: Alig Environmental Solutions, LLC, Ft. Recovery, OH (US)

(72) Inventors: David Dale Alig, Ft. Recovery, OH (US); Gregory K. Alig, Celina, OH (US); Rick E. Alig, Ft. Recovery, OH (US)

(73) Assignee: Alig Environmental Solutions, LLC, Ft. Recovery, OH (US)

( * ) Notice: Subject to any disclaimer, the term of this patent is extended or adjusted under 35 U.S.C. 154(b) by 132 days.

This patent is subject to a terminal disclaimer.

(21) Appl. No.: 16/275,507

(22) Filed: Feb. 14, 2019

(65) Prior Publication Data

US 2019/0174671 A1 Jun. 13, 2019

Related U.S. Application Data

(63) Continuation-in-part of application No. 15/666,893, filed on Aug. 2, 2017, now Pat. No. 10,219,429, (Continued)

(51) Int. Cl.
| A01C 23/00 | (2006.01) |
| A01C 23/02 | (2006.01) |
| A01C 21/00 | (2006.01) |
| A01C 19/02 | (2006.01) |

(52) U.S. Cl.
CPC ......... *A01C 23/008* (2013.01); *A01C 23/002* (2013.01); *A01C 23/003* (2013.01); (Continued)

(58) Field of Classification Search
CPC ... A01C 23/008; A01C 23/022; A01C 23/003; A01C 23/002; A01C 21/002; A01C 19/02
See application file for complete search history.

(56) References Cited

U.S. PATENT DOCUMENTS

| 3,753,409 A * | 8/1973 | Frazier ............... A01C 23/025 |
| | | 111/123 |
| 4,637,547 A * | 1/1987 | Hiniker ............... B05B 12/00 |
| | | 239/1 |

(Continued)

*Primary Examiner* — Qingzhang Zhou
(74) *Attorney, Agent, or Firm* — Jacox, Meckstroth & Jenkins

(57) ABSTRACT

Liquid nutrients are applied to a first group of rows of standing crops by pulling a drag hose from a reel located at one end of a field and between two crop rows with the drag hose connected to an applicator pulled by a tractor or track units. The hose provides a liquid supply to the applicator. At the opposite end of the field, the applicator is turned 180°, and in one embodiment, a boom pivots to project from one end of the applicator to the drag hose. The applicator returns down adjacent crop rows back to the first end of the field with the applicator connected to the drag hose while the reel simultaneously retracts the drag hose between the two crop rows. The reel is moved axially to a third group of crop rows along with the applicator, and the steps are repeated.

9 Claims, 16 Drawing Sheets

Related U.S. Application Data which is a continuation-in-part of application No. 14/296,679, filed on Jun. 5, 2014, now Pat. No. 10,189,673.

(60) Provisional application No. 61/956,391, filed on Jun. 7, 2013.

(52) U.S. Cl.
CPC ............ *A01C 23/022* (2013.01); *A01C 19/02* (2013.01); *A01C 21/002* (2013.01)

(56) References Cited

U.S. PATENT DOCUMENTS

| | | | |
|---|---|---|---|
| 4,756,260 A * | 7/1988 | Petersen | A01C 23/021 111/123 |
| 5,907,925 A | 6/1999 | Guyot | |
| 6,179,216 B1 * | 1/2001 | Panhelleux | A01G 25/095 239/1 |
| 6,427,612 B1 | 8/2002 | Huffman | |
| 6,701,856 B1 | 3/2004 | Zoske et al. | |
| 7,063,276 B2 | 6/2006 | Newton | |
| 7,077,070 B1 | 7/2006 | Williams | |
| 7,509,977 B2 | 3/2009 | Huffman | |
| 7,744,012 B2 | 6/2010 | Manders et al. | |
| 8,256,692 B2 | 9/2012 | Knowles | |
| 9,707,882 B2 | 7/2017 | Ballu | |
| 2011/0186657 A1 * | 8/2011 | Haviland | F41B 9/0087 239/722 |
| 2013/0299601 A1 * | 11/2013 | Ballu | A01M 7/0089 239/1 |
| 2015/0021406 A1 * | 1/2015 | Mercier | B05B 13/005 239/1 |

\* cited by examiner

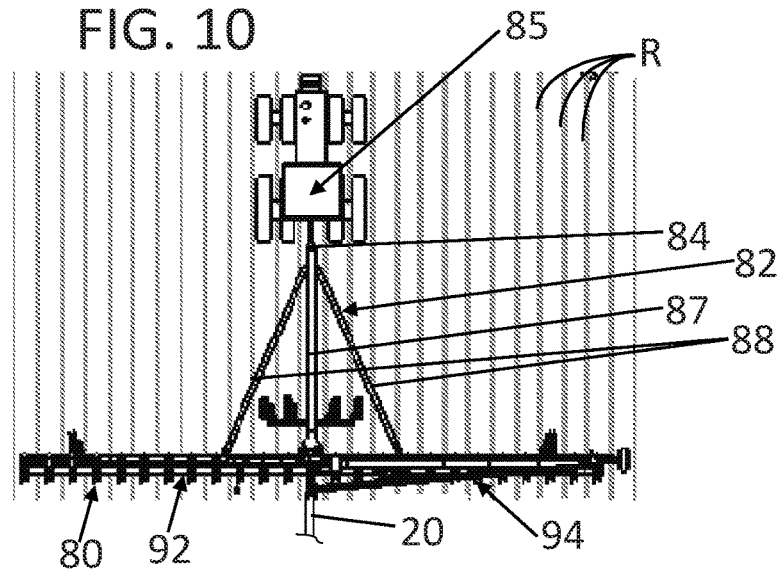
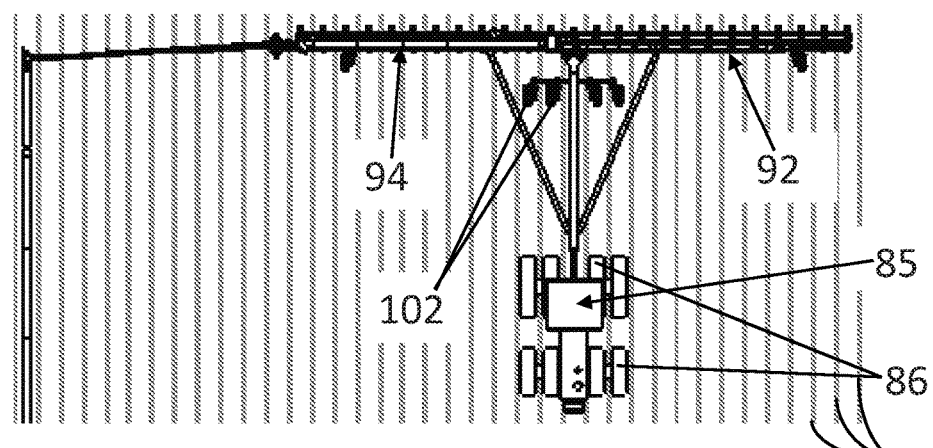
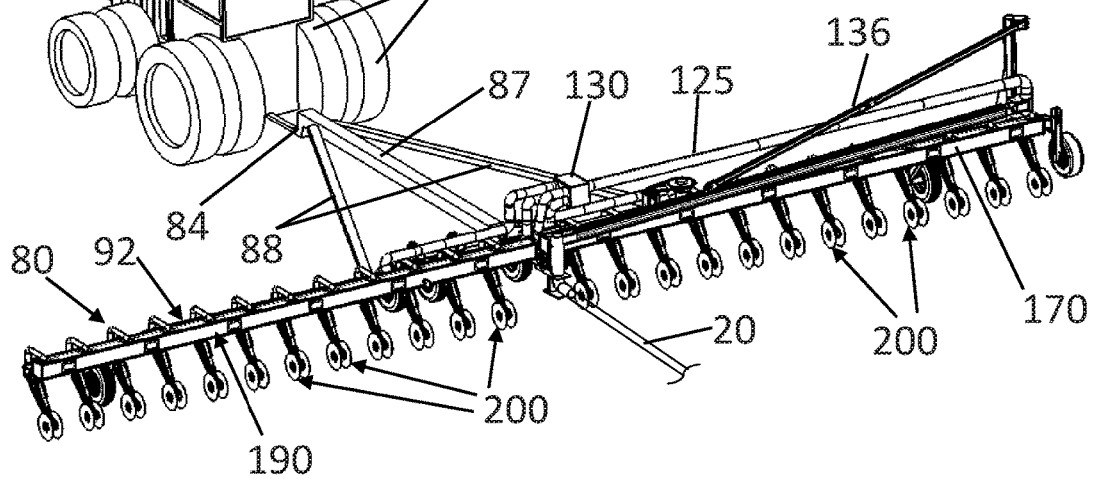

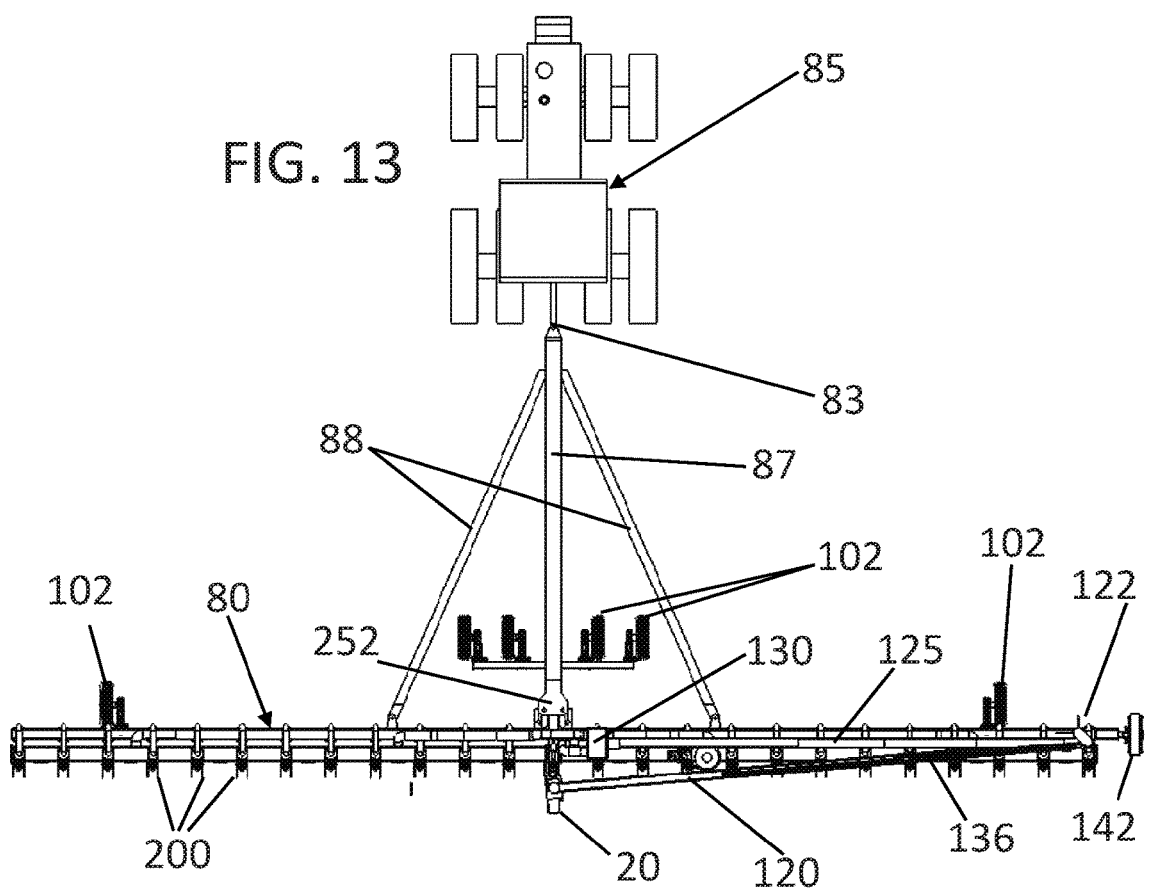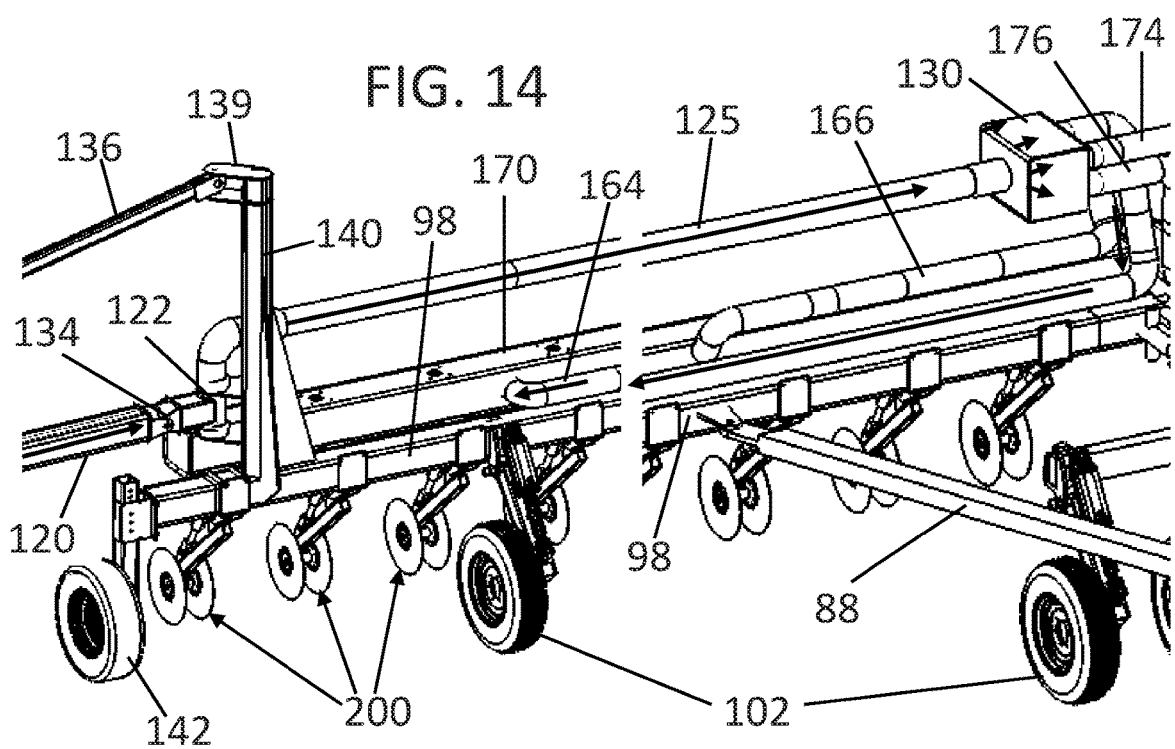

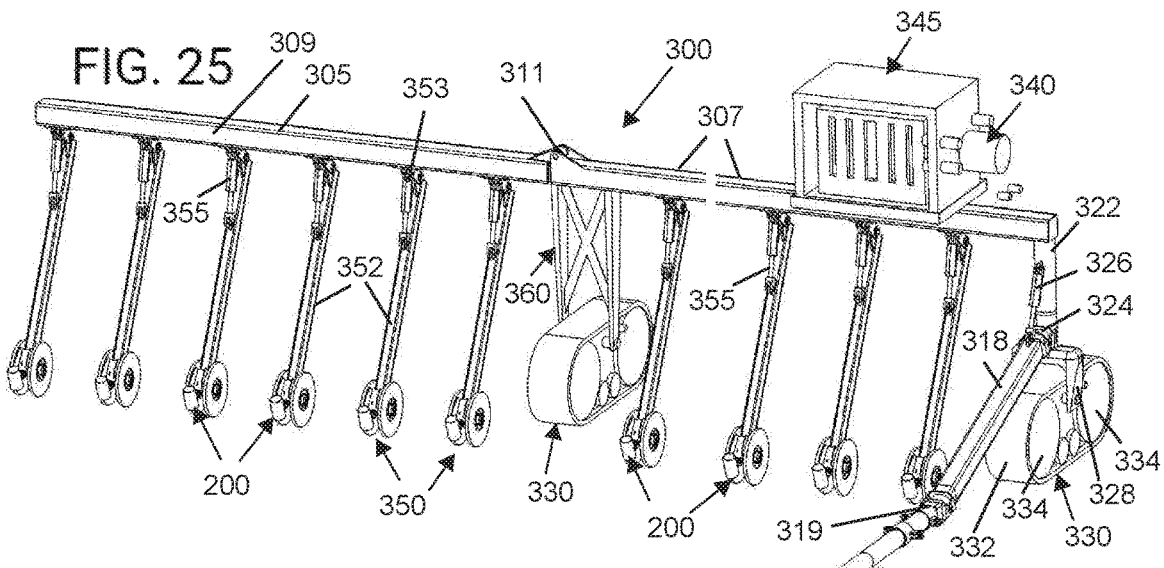
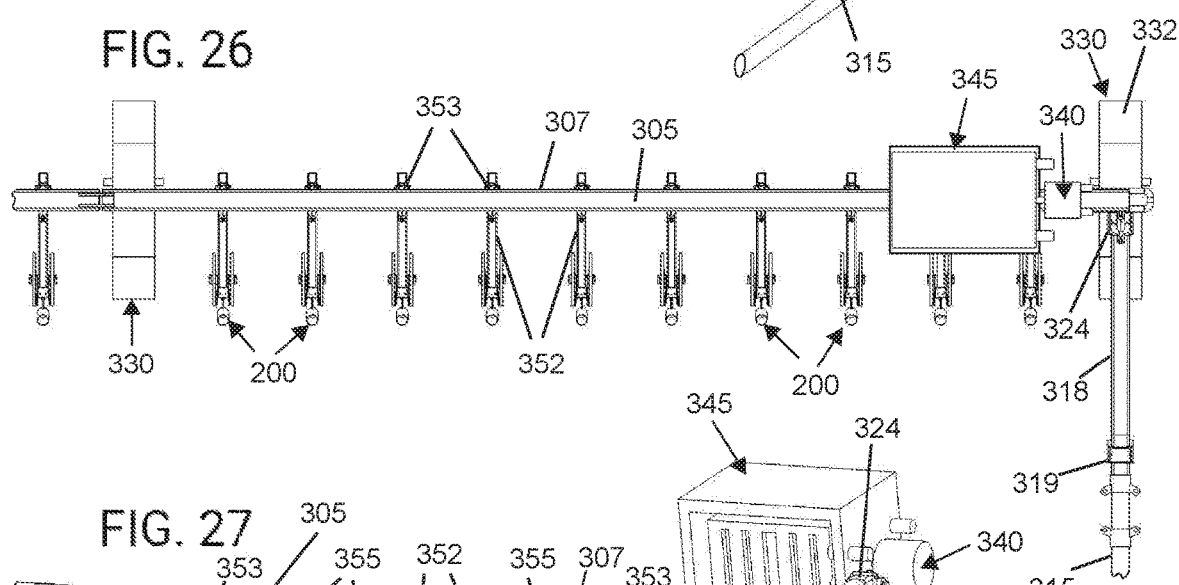
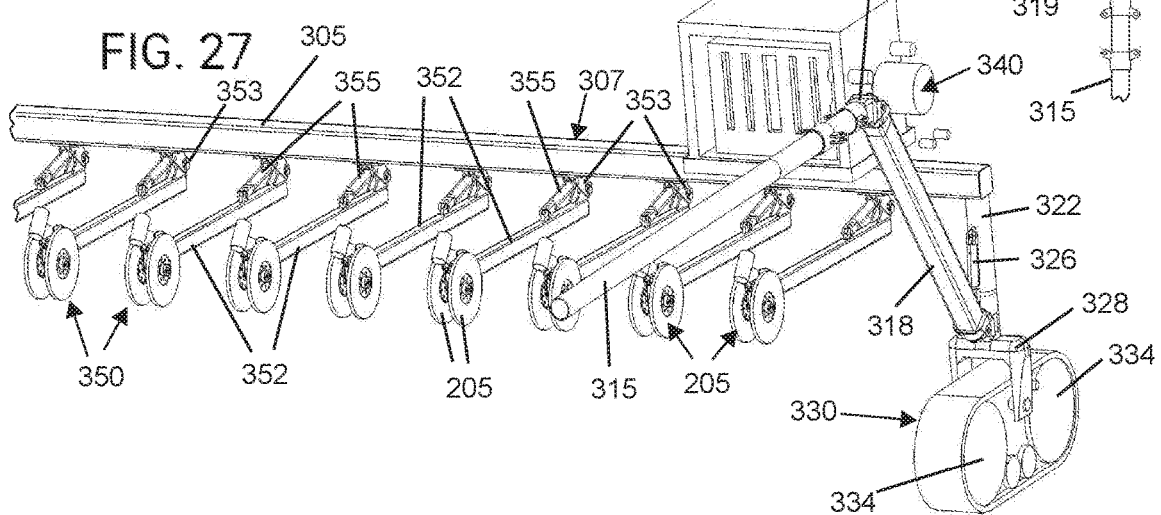

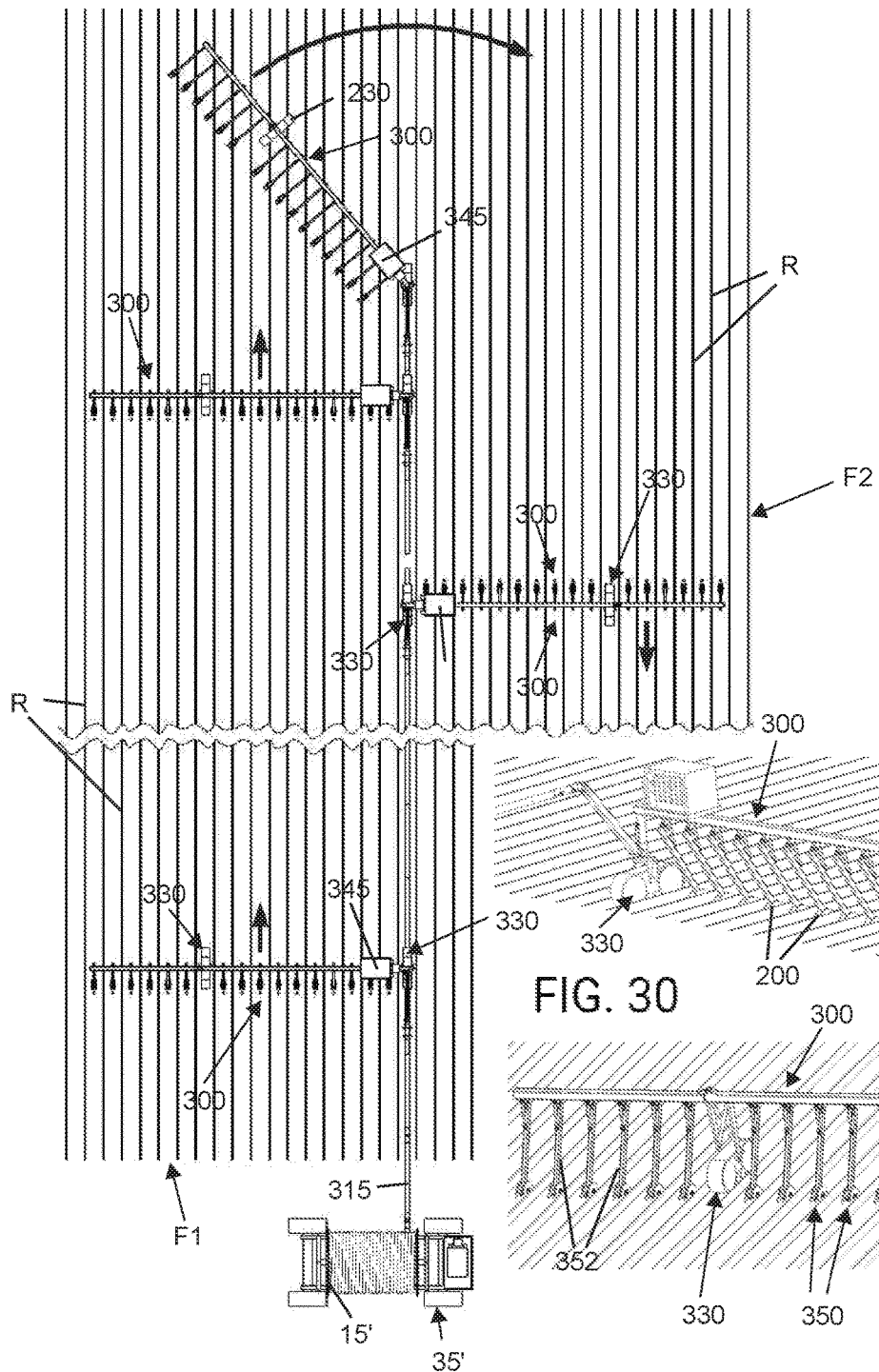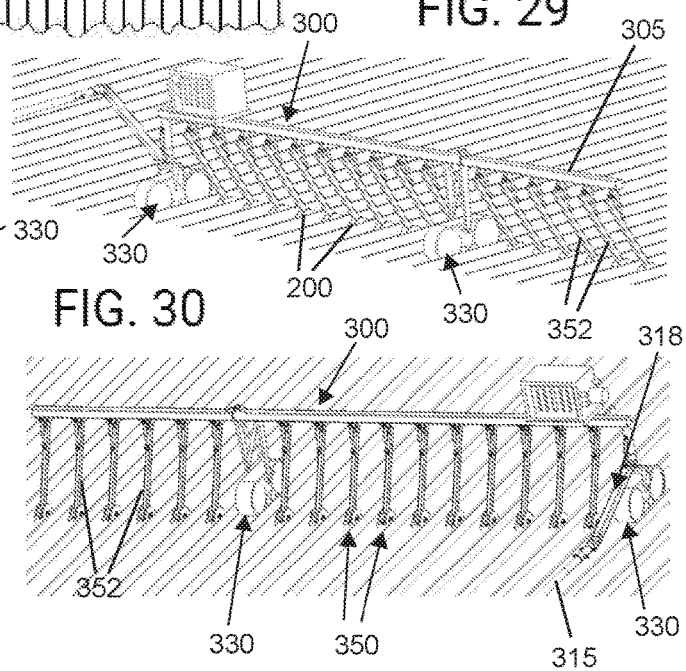

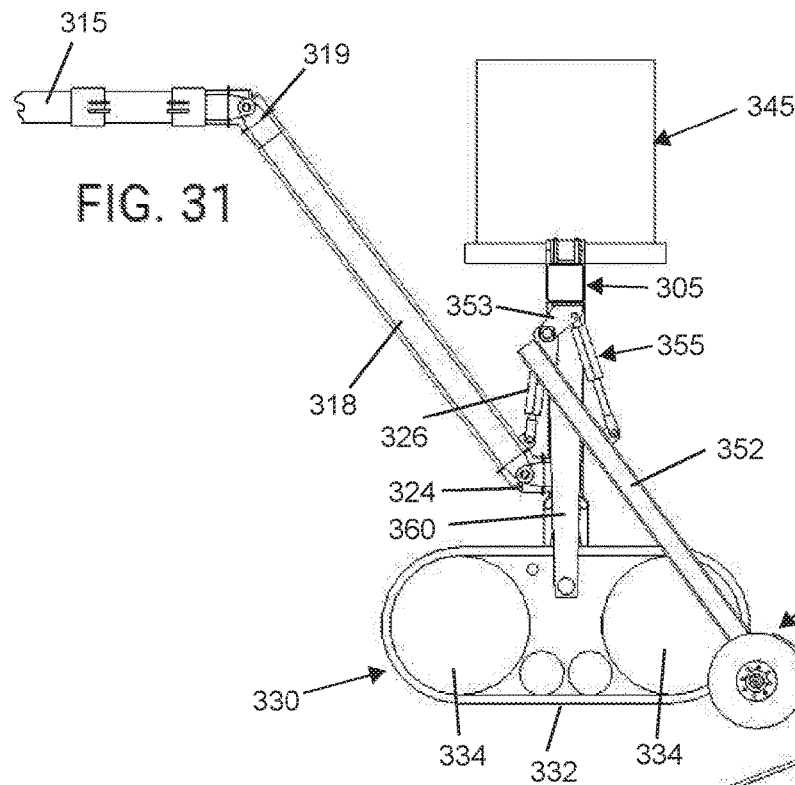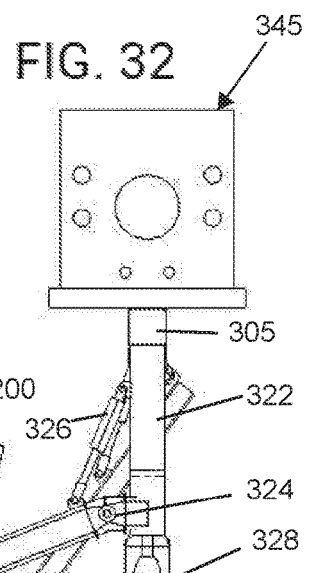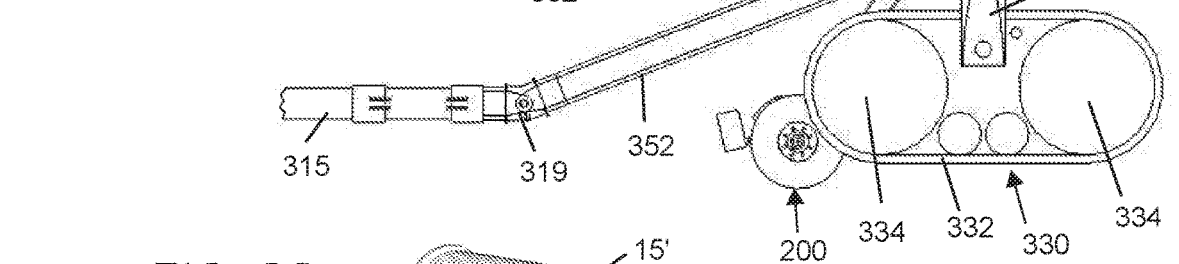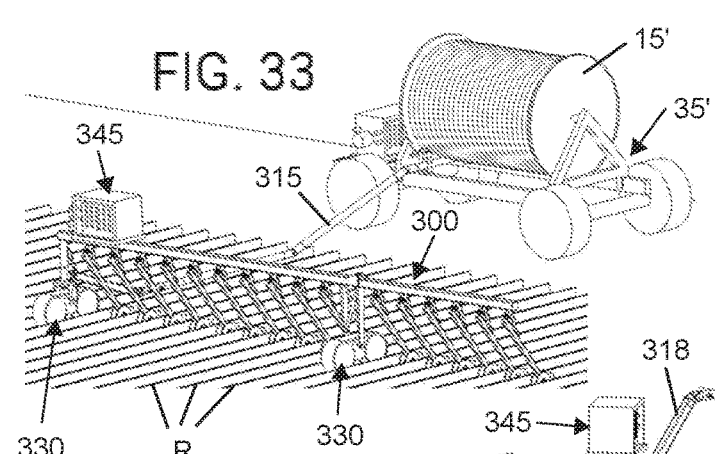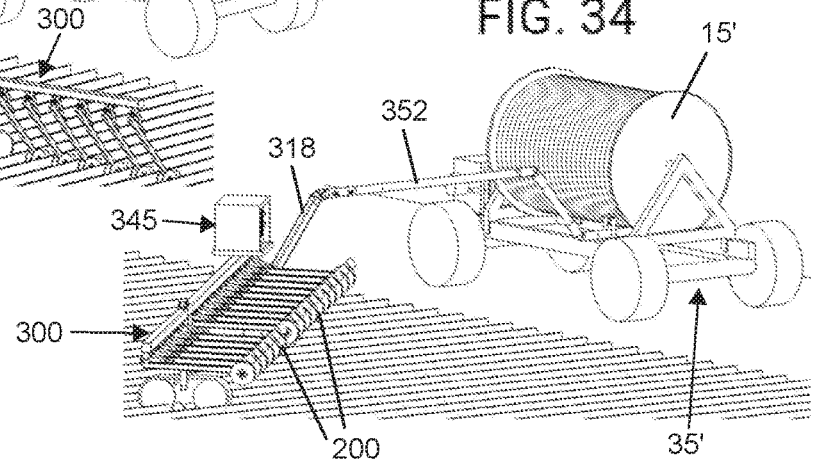

METHOD AND APPARATUS FOR APPLYING LIQUID NUTRIENTS BETWEEN PARALLEL ROWS OF STANDING CROPS

RELATED APPLICATION

This application is a continuation-in-part of patent application Ser. No. 15/666,893, filed Aug. 2, 2017, which is a continuation-in part of patent application Ser. No. 14/296,679, filed Jun. 5, 2014, U.S. Pat. No. 10,189,673, which claims the benefit of Provisional Patent Application Ser. No. 61/956,391, filed Jun. 7, 2013.

BACKGROUND OF THE INVENTION

Various methods and equipment have been proposed and/or used for applying liquid nutrients, such as liquid manure, to large fields before crops are planted or soon after planting, and some of the equipment commonly uses an elongated flexible and hard drag hose which is wound onto a large spool or reel. The inlet of the drag hose receives the liquid manure from a supply line connected to a pump which receives the liquid from a supply source such as a pond or tank or a tank on a vehicle. The outlet of the hose is connected to a combined tool bar and applicator which is carried or pulled into the field by a vehicle such as a farm tractor. The reel with the wound hose may be carried by a trailer pulled by the tractor, for example, as disclosed in U.S. Pat. Nos. 5,907,925 and 7,744,012. It is also known to pull the hose from a supply reel located at an end or middle of the field and back and forth across the field by the tractor and applicator soon after a crop is planted, for example, as disclosed in U.S. Pat. Nos. 6,427,612 and 8,256,692, It has been determined that the best time for applying liquid manure or liquid nutrients to a field used for growing row crops is after the crops have begun to grow but before they go through the process of using the majority of nutrients they use, for example, after parallel rows of corn have grown over one or two feet. This keeps the nutrients within the liquid from reaching or flowing or leaking into adjacent streams, rivers or lakes. It is also highly desirable to apply the liquid nutrients efficiently without significantly compacting the soil which results when a large reel wound with a drag hose is carried by a trailer pulled into a field while the liquid is being pumped through the hose or as a result of pulling or transporting a large tank filled with liquid nutrients through the field with a tractor. For example, when a reel having an extended length of drag hose, for example, over 2,000 feet, is filled with the liquid, the combined weight of the reel, drag hose, liquid and trailer is substantial and significantly compacts the soil in the field and can damage the crops, including the end crop rows in the field when the equipment turns to apply the liquid to another group or plurality of crop rows.

SUMMARY OF THE INVENTION

The present invention is directed to an improved system or method and apparatus for applying liquid nutrients such as liquid manure between parallel rows of standing crops growing in a field and with minimal damage to the crops. In accordance with illustrated embodiments of the invention, an elongated flexible and hard drag hose is wound onto a power driven hose reel with the hose having an inlet end and an outlet end and an inside diameter of several inches. The hose reel is supported by a trailer or vehicle for axial movement adjacent a first end of a field and in a direction perpendicular to the rows of crops extending the length of the field. The inner end of the drag hose wound on the reel receives the liquid nutrients pumped from a supply source.

In one embodiment, the outer end of the drag hose extends from the hose reel to an end portion of a supply line or conduit supported by or formed by an elongated boom having an opposite end portion which may be supported by a wheel. An end portion of the boom is pivotally connected to a central or end portion of an elongated applicator which is carried by or pulled by a tractor adapted to move between the crop rows with the applicator extending transversely or perpendicular to the rows. The opposite end portion of the supply line or conduit is connected to a liquid distribution system carried by the applicator and having outlets located between the crop rows. While the liquid nutrients are pumped into the inlet end of the drag hose supported by the hose reel, the drag hose is pulled with the tractor in alignment with the center of the tractor and from the hose reel between two adjacent rows of crops so that the hose reel rotates on its axis perpendicular to the crop rows.

The drag hose is maintained between the two adjacent rows of crops while being pulled from the reel with the tractor. At the opposite end of the field, the tractor and applicator make a 180 degree turn while the boom and supply line or conduit are elevated to swing over the crops, with the boom projecting from an end of the applicator. The tractor and applicator are positioned with the applicator perpendicular to another second plurality of crop rows.

As the tractor and applicator return to the first end of the field, the liquid nutrients are preferably supplied continuously through the drag hose, supply conduit and applicator distribution system to the second plurality of crop rows. The drag hose is maintained between the two adjacent crop rows with the boom and conduit extending laterally from the tractor and applicator and while the drag hose is wound back onto the hose reel. With the rewinding of the drag hose onto the hose reel, the rewinding is synchronized, preferably by a remote control from the tractor, with the return of the tractor and applicator to the first end of the field. The hose reel and rewound hose are then moved axially with the vehicle or trailer and in a direction perpendicular to the crop rows to a third plurality of crop rows where the tractor with the applicator are repositioned with the boom retracted so that the above steps for applying the liquid nutrients may be repeated.

The boom has a length generally the same as or about one half the length of the applicator, and the outer end portion of the boom, which carries or forms the supply line or conduit, may be supported by a wheel and may be elevated to clear the crops at the turn. The wheel support frame may also be connected to a hydraulic cylinder or motor controlled from the pulling tractor for elevating the boom and supply conduit and/or for rotating the boom support wheel. When the boom is elevated with the applicator as controlled from the tractor at the opposite end of the field, the extended boom swings to a position projecting from the end of the applicator while the tractor and applicator are making the U-turn at the opposite end of the field.

The hose reel may be moved axially during winding and unwinding of the drag hose in order to maintain the drag hose between the two adjacent rows of standing crops during a full round trip of the tractor and applicator. The hose reel may also be moved axially either with a hydraulic motor connected to a carriage supported by parallel tracks on the vehicle or by moving the vehicle linearly, for example by hydraulically driving the wheels on the vehicle. As the drag hose unwinds from the hose reel or is rewound on the hose reel, the position of the drag hose may be detected by a sensing system which controls the axial movement of the hose reel through a hydraulic valve which controls the linear movement of the carriage on the vehicle or the linear movement of the vehicle to produce axial movement of the hose reel according to the helical winding of the hose on the reel. The drag hose on the reel may also be guided by a set of rollers supported by a frame connected to the reel support and projecting from one side of the reel to direct and align the hose between the two rows of crops during unwinding and rewinding of the hose.

Another embodiment of the invention incorporates an elongated applicator having a tubular frame forming a toolbar and conduit and which is supported by two tractors in the form of power driven narrow endless flexible tracks. The outer end portion of the drag hose is connected to one end of the applicator by a pivotal boom forming a continuous conduit for the liquid nutrients. The end portion of the applicator also supports a power unit which supplies power to the motors within the endless tracks. A plurality of longitudinally spaced coulter units are supported by corresponding inclined tubular conduits for supplying liquid nutrients between the rows of crops. The coulter units are retractable by hydraulic cylinders for movement between a ground engaging position and a retracted position generally above the crops.

Other features and advantages of the invention will be apparent from the following description, the accompanying drawings and the appended claims.

BRIEF DESCRIPTION OF THE DRAWINGS

FIG. 10 is a diagrammatic plan view of a field, similar to FIG. 1, and illustrating the general construction of apparatus constructed in accordance with another embodiment of the invention for applying liquid nutrients between rows of standing crops and with the apparatus moving outwardly from one or home end of a field toward the opposite end of the field;

FIG. 11 is a plan view similar to FIG. 10 and showing the apparatus returning to the first or home end of the field in accordance with the invention;

FIG. 12 is a perspective view of the applicator used in the apparatus shown in FIG. 10;

FIG. 13 is generally a plan view of a apparatus shown in FIG. 10;

FIG. 14 is a fragmentary perspective view of the applicator shown in FIGS. 10-13 and with center and end portions broken away and showing the direction of flow liquid nutrients through the applicator;

FIG. 25 is a generalized perspective view of another embodiment of the invention with an applicator for applying liquid nutrients between parallel rows of standing crops;

FIG. 26 is a fragmentary plan view of the applicator shown in FIG. 25;

FIG. 27 is a fragmentary perspective view of the applicator shown in FIGS. 25 and 26 with coulter units retracted upwardly and the outlet end portion of the drag hose and support boom retracted upwardly;

FIG. 28 is a diagrammatic plan view showing use of the applicator of FIGS. 25 and 26 within a field of parallel rows of standing crops;

FIGS. 29 and 30 are perspective views of the applicator shown in FIGS. 25-27 and in use in FIG. 28;

FIG. 31 is a vertical section view of the applicator shown in FIG. 29;

FIG. 32 is an end view of the applicator shown in FIG. 30;

FIG. 33 shows the applicator of FIG. 25 and connected to a drag hose extending from a supply reel when the applicator begins to supply liquid nutrients at the first end of the field; and FIG. 34 shows a turn of the applicator after it returns to the first end of the field.

DESCRIPTION OF APPARATUS CONSTRUCTED AND USED IN ACCORDANCE WITH INVENTION

Figure 1:
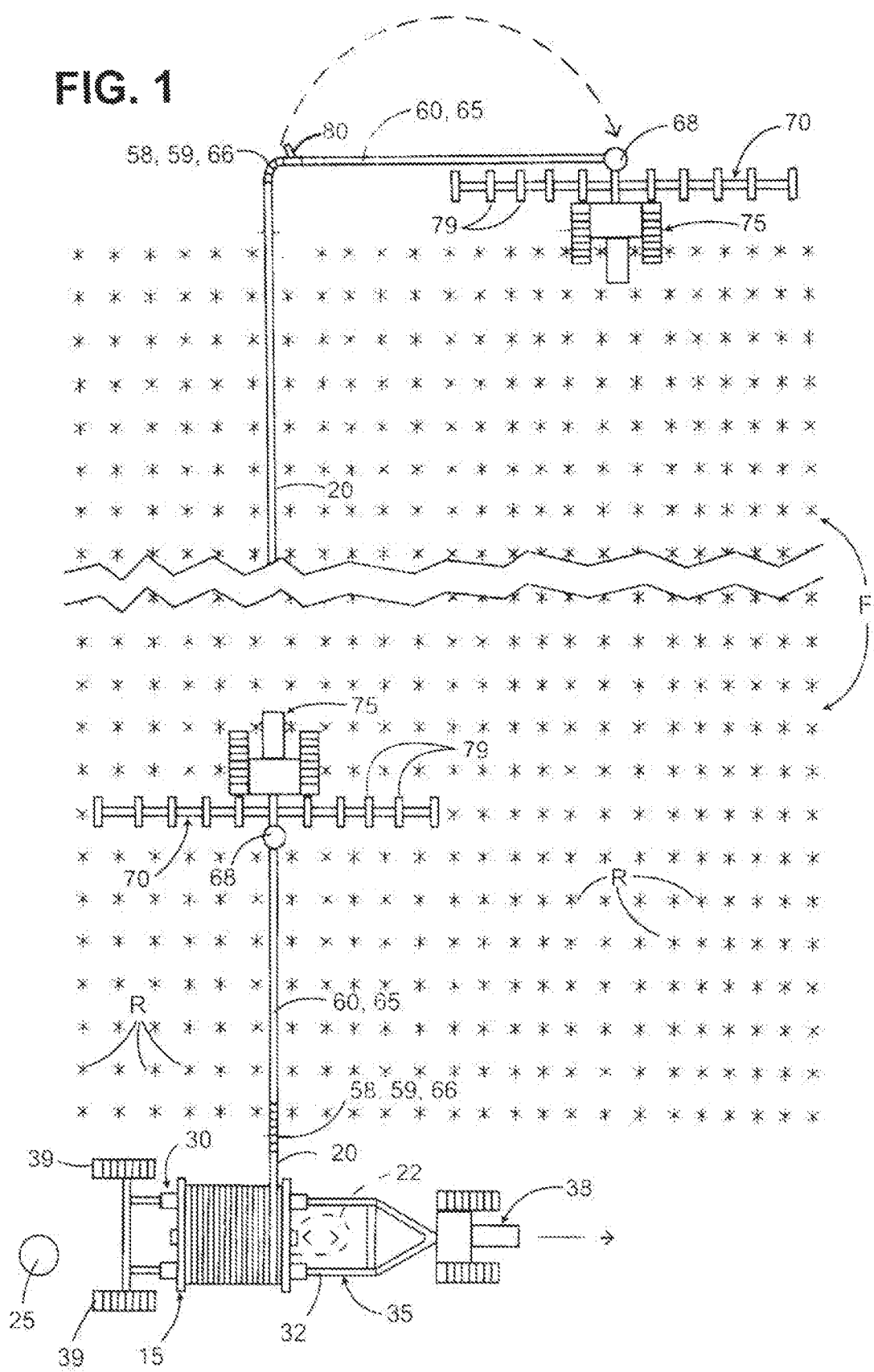
FIG. 1 is a diagrammatic plan view of a field with parallel rows of standing and growing crops and illustrating the general construction and use of equipment or apparatus in accordance with one embodiment of the invention for applying liquid nutrients between the rows of standing crops with a drag hose.

Referring to FIG. 1, a large diameter spool or reel 15 is helically wound with multiple courses of an elongated flexible and hard drag hose 20 which has an inner inlet connected to a flexible supply line 22 extending from a supply source 25 of liquid nutrients which herein may be referred to as liquid. The reel 15 has a large diameter, for example, about fourteen feet, and an axial length of about twelve feet. The drag hose 20 has an inner diameter, for example, over four inches and preferably about five inches in diameter, and an extended length, for example, over 2,000 feet and preferably over 2500 feet. The reel 15 and wound drag hose 20 may be supported for axial movement, for example, a distance of fourteen feet by a carriage 30 which travels on parallel spaced rails 32 of a vehicle or trailer 35 pivotally connected by a hitch to a tow tractor 38.

Figure 7:
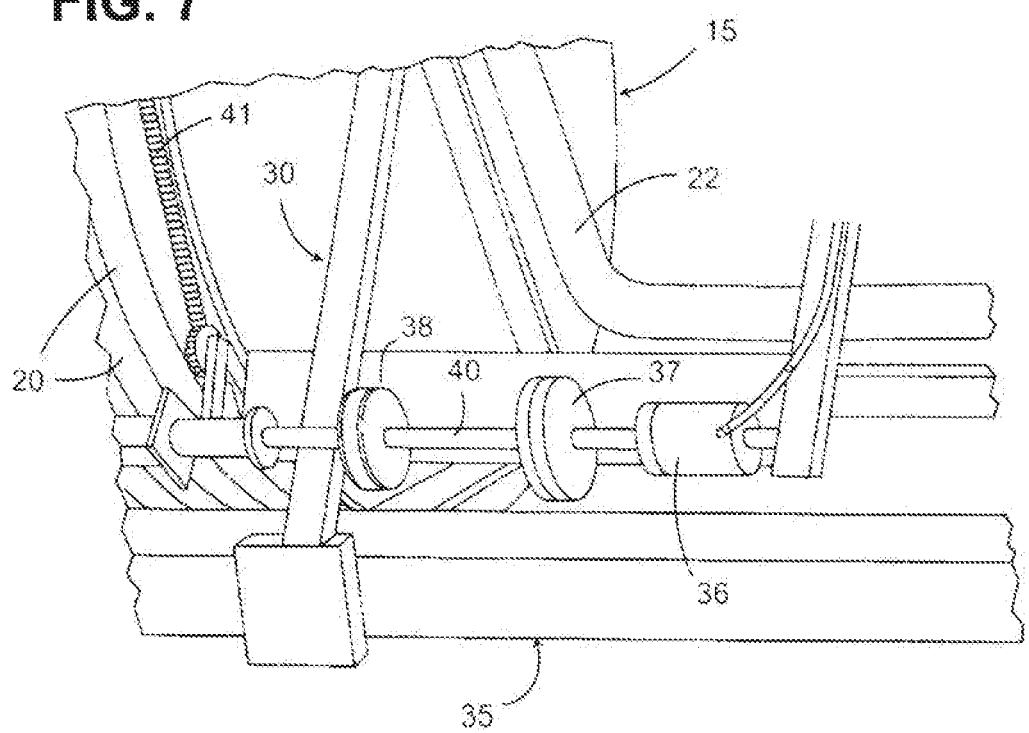
FIG. 7 is a diagrammatic perspective view of the drive for the hose reel.

Axial movement of the reel 15 and linear movement of the carriage 30 may be produced by a reversible hydraulic motor (not shown) which drives a chain extending under the reel 15 within the trailer and having opposite end portions connected to opposite ends of the carriage 30. The chain may be driven by the reversible hydraulic motor, and another reversible hydraulic motor 36 (FIG. 7) may be carried by the vehicle 35 and is connected to rotate the reel 15 through a horizontal drive shaft 40 connected by chains 41 which extend around opposite end portions of the reel 15 and around corresponding sprockets on the drive shaft. A hydraulic actuated clutch 37 and brake 38 may be used to connect the reversible hydraulic motor 36 to the drive shaft for precisely controlling the reversible rotation of the reel 15 on the carriage 30 or vehicle 35.

Figure 3:
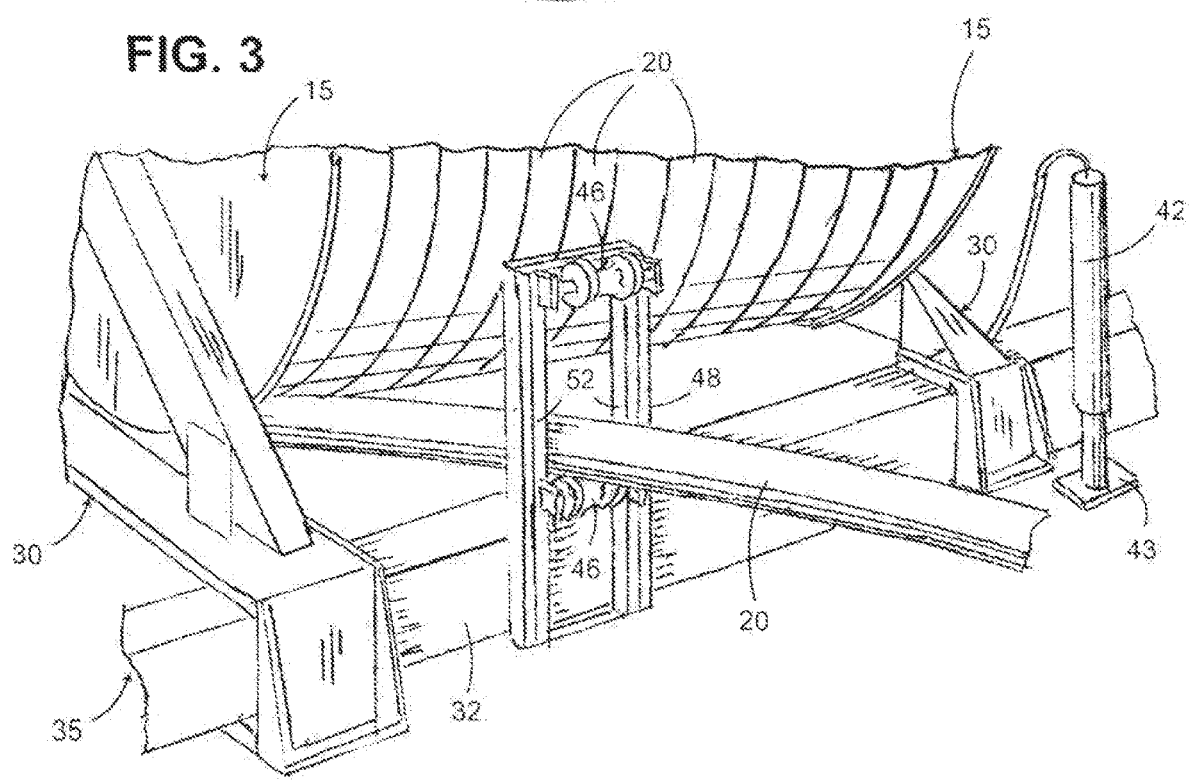
FIG. 3 is a fragmentary perspective view of a vehicle frame supporting a hose reel for rotation on its axis and for axial movement of the hose reel and drag hose with the vehicle.

It is also within the scope of the invention to move the reel 15 axially by supporting the reel 15 for rotation only on the vehicle 35 and driving each of the wheels 39 supporting the vehicle 35 with a reversible and controllable hydraulic motor. All of the hydraulic motors on the vehicle 35 are supplied with pressurized hydraulic fluid from a reservoir and engine driven pump on the vehicle or from the tow tractor 38, and the motors may be remotely controllable. As shown in FIG. 3, opposite end portions of the vehicle 35 may have hydraulically actuated cylinders 42 with downwardly projecting piston rods supporting retractable stabilizing pads 43 for engaging the ground when the drag hose 20 is being pulled and unwound from the reel 15 to prevent tilting of the vehicle 35. Either cylinder 42 may be inclined or vertical.

As also shown in FIG. 3, when the drag hose 20 is pulled from the reel 15 or is helically rewound on the reel by the hydraulic motor 36 which rotates the reel, the drag hose 20 may pass between a pair of vertically spaced guide rollers 46 supported by a frame 48 supported for tilting movement on a vertical axis relative to the carriage 30. A pair of opposing vertical rollers or plastic guide strips 52 are also supported by the frame 48, and a control rod may be connected to the frame 48 to sense tilting movement of the frame on the vertical axis as the drag hose 20 is unwound or rewound on the reel 15. The control rod may be connected to a hydraulic valve (not shown) which controls the hydraulic motor connected to move the carriage 30 on the trailer or vehicle 35 horizontally back and forth to obtain uniform helically winding of the drag hose 20 on the reel 15. The hydraulic valve may also be used to move the vehicle 35 back and forth by controlling the hydraulic motors which drive the wheels 39 of the vehicle.

Figure 8:
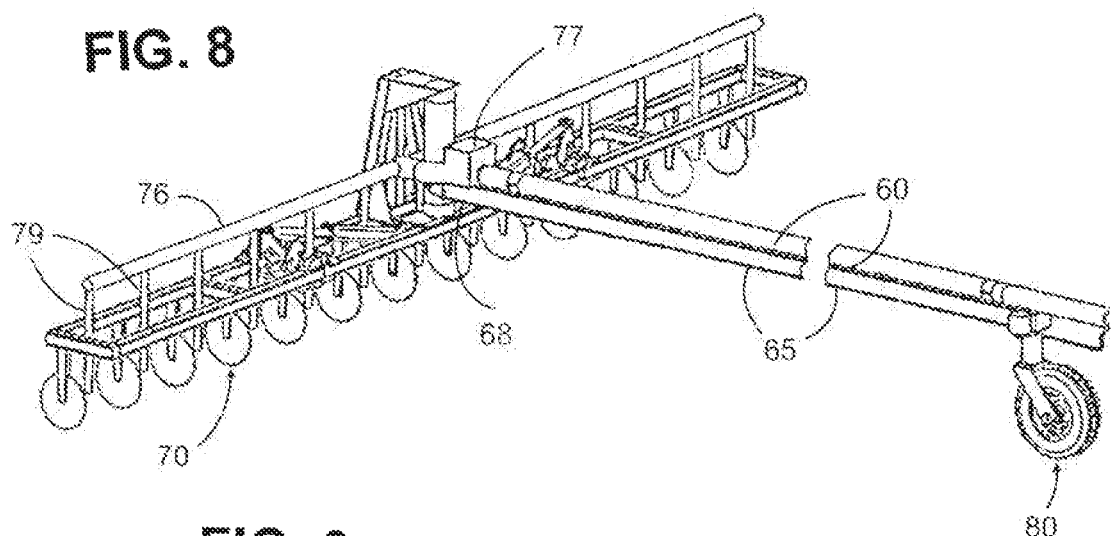
FIG. 8 is a perspective view of an applicator pivotally connected to the boom and supply line.

The opposite outlet end of the drag hose 20 is connected by a flexible line or hose coupling 58 (FIG. 4) to a rearward end portion 59 of an elongated tubular supply line 60 supported on top and carried by an elongated fabricated steel boom 65. The boom 65 has a pivotal rearward end portion 66 which supports the end portion 59 of the supply line 60, and the end portion 66 is pivoted by a hydraulic cylinder 62. Another flexible line or coupling 58 connects the supply line 60 to the end portion 59 of supply line 60. Both the supply line 60 and the boom 65 may have substantial length, for example, on the order of 40 feet, but the boom 65 may be telescopic, and the supply line 60 may be foldable. The forward end portion of the boom 65 is pivotally connected by a universal or flexible coupling 68 to a laterally extending elongated tool bar and liquid applicator 70 which is carried by and supported for vertical movement by a tractor 75 (FIG. 1). The applicator 70 has a liquid distribution line 76 (FIG. 8) connected to the forward end portion of the liquid supply line 60 by a liquid distributor 77 of the general type, for example, as disclosed in U.S. Pat. Nos. 6,427,612, 7,063,276 or 7,509,977. The liquid distribution line 76 carried by the applicator 70 supplies the liquid to outlets or nozzles 79 (FIG. 8) located between crop rows R and directed to the ground surface or slightly below the ground surface. Different forms of crop row applicators are disclosed, for example, in U.S. Pat. Nos. 6,701,856 and 7,077,070.

Figure 2:
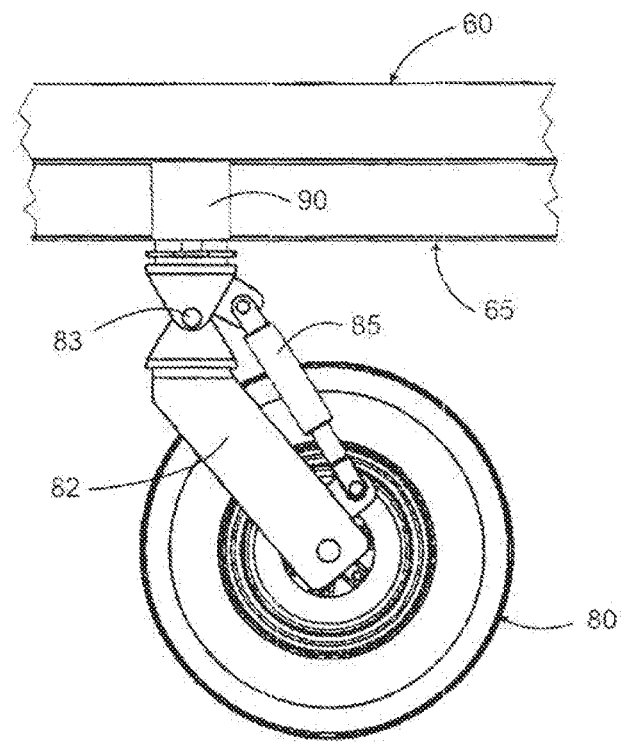
FIG. 2 is a side view of a vertically movable wheel for supporting a boom which carries a liquid nutrient supply line or conduit connected to an applicator attached to a tractor, as shown in FIG. 1.
Figure 4:
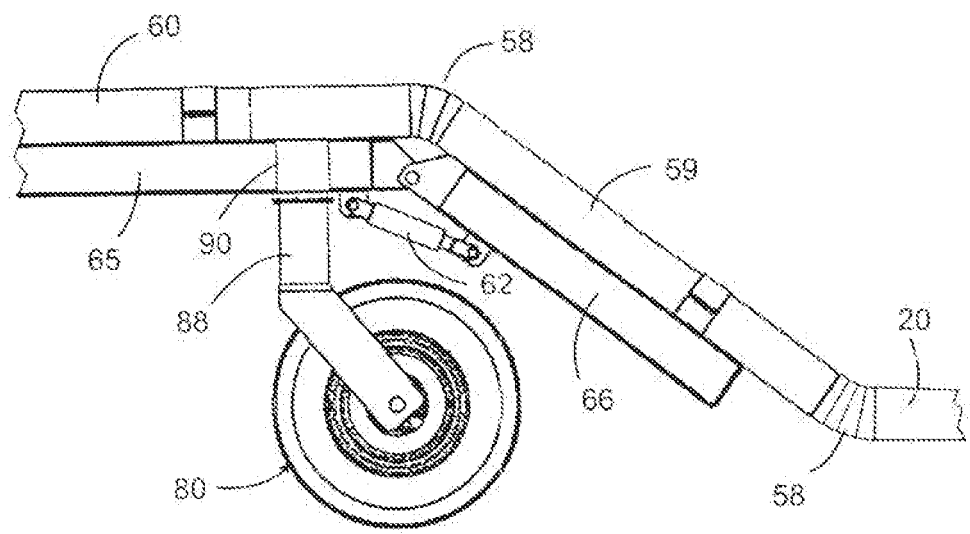
FIG. 4 is an elevational view of a rearward portion of an elevated boom supported by wheel and with a pivotable end portion of the boom supporting a flexible rearward portion of the supply line connected to the drag hose.
Figure 5:
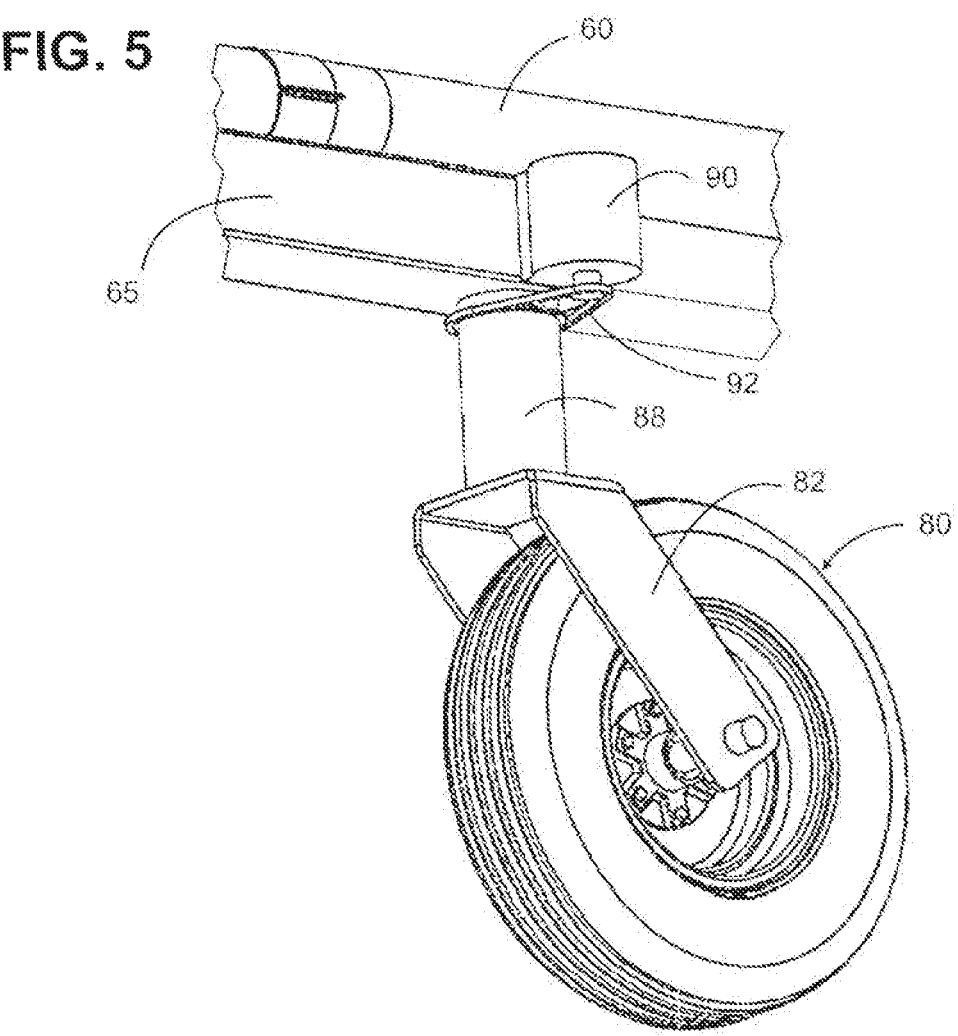
FIG. 5 is a fragmentary view of the rearward portion of the boom and supply line shown in FIG. 4 and also showing a motor drive for rotating the caster wheel.
Figure 6:
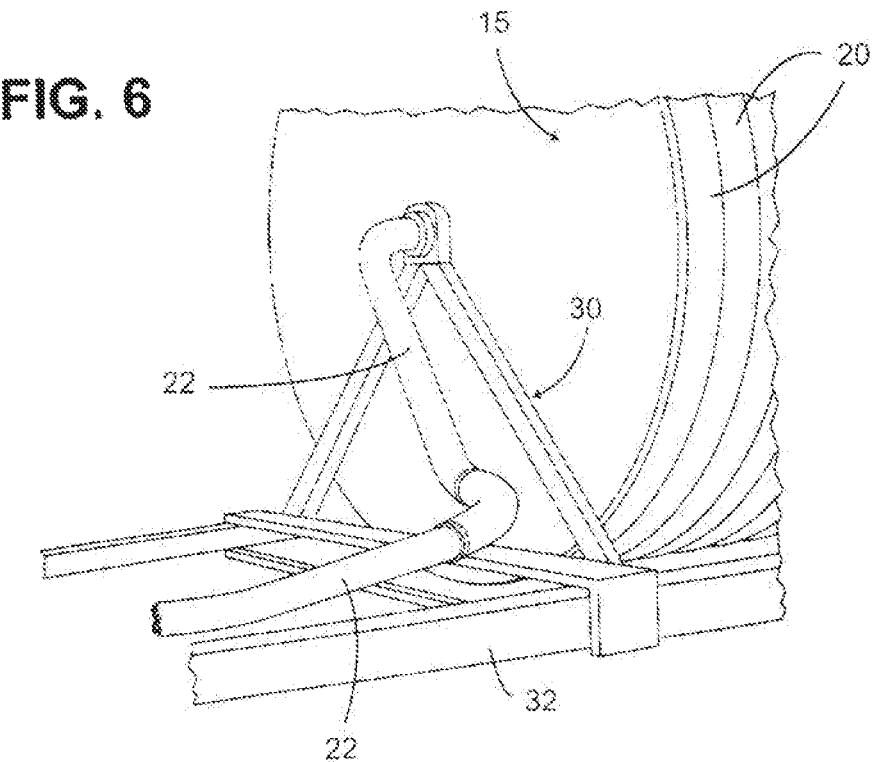
FIG. 6 is a fragmentary perspective view of the inlet end of the hose reel for supplying liquid nutrients to the drag hose.

Referring to FIG. 2, a rearward portion of the boom 65 may be supported by a wheel such as a caster wheel 80 which rotates on a vertical axis and may be controlled for rotation by the operator of the tractor 75. The wheel 80 is supported by arms 82 pivotal on a horizontal axis by a pin 83. The rearward portion of the boom 65 may be elevated by actuation of a hydraulic cylinder 85 connected to the arms 82 and controlled from the tractor 75. As shown in FIGS. 4 & 5, the caster wheel 80 may be supported for pivoting only on a vertical axis and be supported by a vertical tubular shaft 88 which is rotated by a hydraulic motor 90 connected to the shaft 88 by a chain drive 92 (FIG. 5). The motor 90 may also be controlled from the tractor 75.

The equipment or apparatus described above is used for applying liquid manure or liquid nutrients between parallel rows R of standing crops, such as rows of growing corn having spacing of thirty inches between rows and a height of two or three feet. The drag hose reel 15 is supported by the vehicle 35 and is located at one end of a field F which may have substantial length, for example, one-half mile. The tractor 75 and boom 65, with the pivotal end portion 66, pull the drag hose 20 from the reel 15 while the liquid is being pumped through the drag hose 20 from the supply source 25. The liquid is supplied to the distributor line 76 of the applicator 70 through the supply line 60 carried by the boom 65, and the applicator 75 dispenses the liquid nutrients into the ground between the crop rows R. As the hose 20 is pulled from the reel 15, the reel brake 38 (FIG. 7) may be applied to prevent overrunning. The reel 15 can move in an axial direction by movement of the carriage 30 or by driving the vehicle wheels 39 or by movement of the tractor 38. The hose 20 may also be directed by guide rollers supported at the side of the trailer or vehicle, as mentioned above, in order to maintain the hose 20 between two adjacent crop rows R as the hose is unwinding. After one course of drag hose is removed from the reel 15 as the tractor 75 moves down the field, the reel 15 either moves axially in an opposite direction for removing another course of the drag hose or the hose guide rollers at the side of the reel direct the hose between the two rows of crops.

Figure 9:
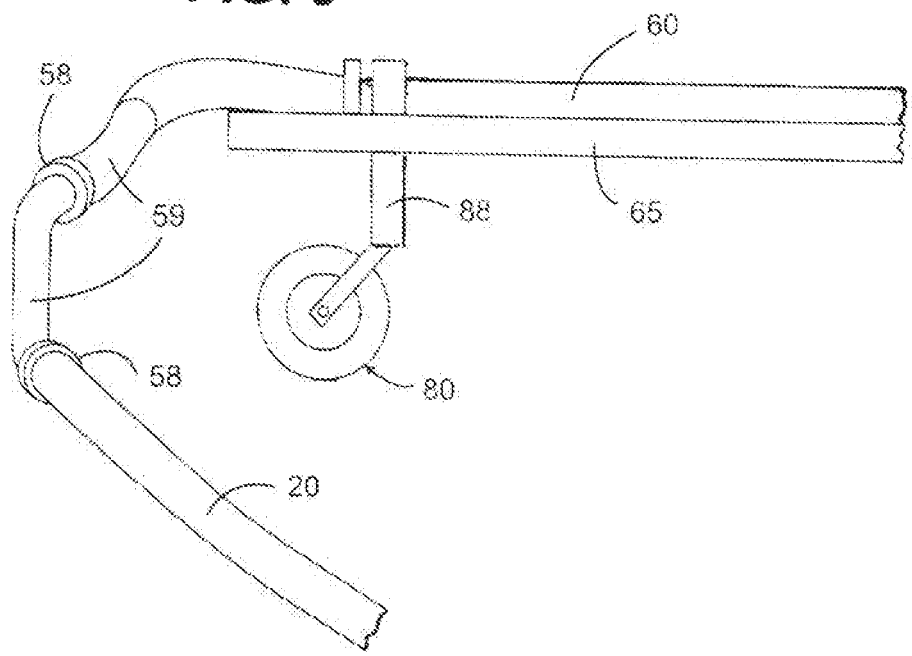
FIG. 9 is a perspective view of rearward end portions of the boom and supply line connected by flexible hoses to the outlet end of the drag hose.
Figure 15:
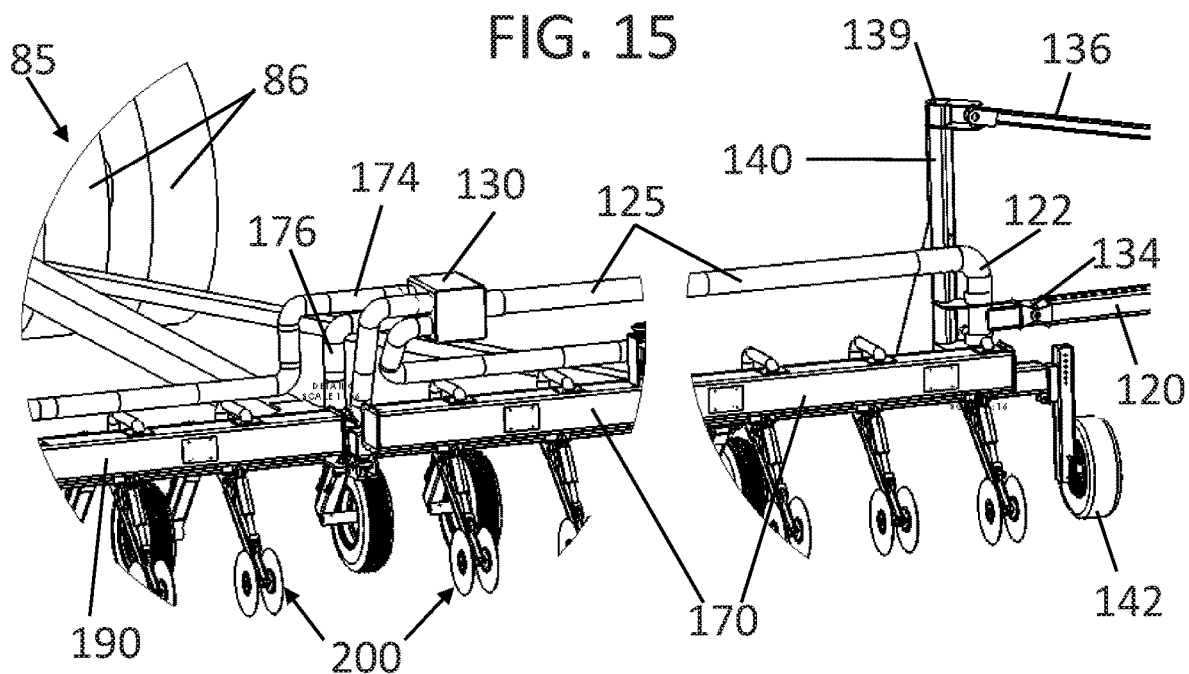
FIG. 15 is a fragmentary perspective view of the applicator shown in FIG. 14.

When the tractor 75 and applicator 70 reach the distal or opposite end of the field F, as shown in the upper portion of FIG. 1, the applicator 70 and the forward end portions of the boom 65 and supply line 60 are elevated by the tractor 75. The rearward end portion of the boom 65 and the supported supply line 60 may remain elevated as shown in FIG. 4 or may be elevated by pivoting the caster wheel 80 as shown in FIG. 2. The tractor 75 then makes a U-turn causing the elevated boom 65 and supply line 60 to pass over an outer end portion of the elevated applicator 70. The boom 65 pivots on the coupling 68 until the boom 65 projects laterally from the tractor 75 and applicator 70, as shown in FIG. 1, causing the flexible hose 59 and couplings 58 to bend as shown in FIG. 9 so that the drag hose 20 remains between the two adjacent crop rows R where the drag hose was pulled the entire length of the field. While the applicator 70 is illustrated to dispense and apply liquid nutrients between twelve crop rows R, the applicator 70 is preferably constructed to dispense and apply the liquid between more than twelve crop rows, for example between at least sixteen crop rows.

After the tractor 75 and attached applicator 70 complete the U-turn in the parallel end rows of the crop rows which usually extend perpendicular to the crop rows R, the tractor 75 and applicator 70 are positioned to apply liquid to another plurality or group of crop rows R, as shown in the upper portion of FIG. 1. As the tractor 75 and lowered applicator 70 return to the first end of the field, the liquid is continuously supplied to the applicator 70 through the drag hose 20 and supply line 60. As the tractor 75 and applicator 70 return to the first end of the field, the drag hose 20 is retracted by the hose reel 15 at the same rate of movement of the tractor 75 while the elevated supply line 60 and boom 65 continue to project laterally from the tractor and pass over the tops of the growing crops in the crop rows R. The end portion 66 of the boom 65 remains elevated by the cylinder 62 and caster wheel 80 during the turn and return so that only a minimum of the growing crops in the end crop rows are damaged. While the drag hose 20 is being retracted on the power driven reel 15, the reel either shifts back and forth axially by movement of the carriage 30 or by movement of the vehicle 35 or is directed by the side guide rollers so that the drag hose always remains between the two adjacent crop rows R during the return of the tractor 75 and applicator 70.

After the tractor 75 and applicator 70 arrive at the end portion of the field where the vehicle 35 and tractor 38 are located, the drag hose 20 is fully retracted on the reel 15. The vehicle 35 then moves forwardly to position the retracted drag hose 20 to the next plurality or group of crop rows R, and the tractor 75 and applicator 70 make another U-turn close to the vehicle 35. The above cycle is repeated until the entire field has received the liquid nutrients or liquid manure between the crop rows R. The movement and operation of the vehicle 35 and the rotation of the reel 15 may be controlled from the tractor 75 by use of a global positioning system such as a GPS Guided Tractor System. During the entire movement of the tractor 75 and applicator 70 back and forth along the length of the field, liquid is preferably supplied continuously to the applicator. If it is necessary to stop the flow of liquid to the applicator 70 momentarily while the tractor 75 makes a U-turn at the opposite ends of the field, a small liquid cumulator tank may be carried by the tractor 75 or by the vehicle 35 and be connected to the drag hose supply line 22 or to the applicator supply line 60 on the boom 65.

Figure 16:
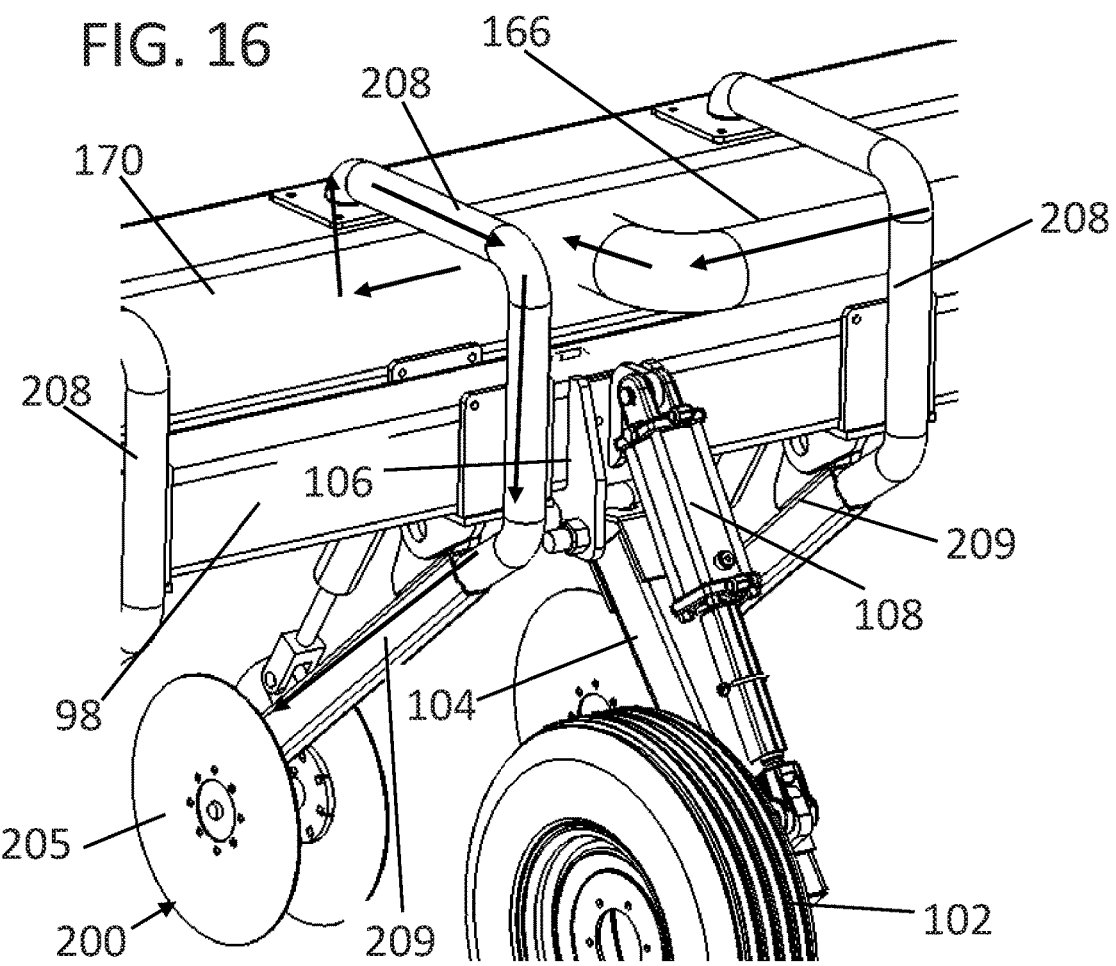
FIG. 16 is an enlarged fragmentary perspective view of a center portion of the applicator shown in FIG. 15.

FIGS. 10-24 are directed to another embodiment of the invention and which primarily includes another form of applicator 80 which has a tongue 82 connected by a pivotal hitch 84 to the tow bar of tractor 85 having wheels 86 positioned to move between the rows R of standing crops growing in a field. The tongue 82 is constructed with a center tow frame member 87 and a pair of angular tow frame members 88 which are pivotally connected to the hitch 84 and releasably connected to two foldable wings 92 and 94 of the applicator 80. Each wing 92 and 94 of the applicator has an elongated tool bar or frame member 98 (FIG. 14) which is supported by a set of retractable wheels 102 (FIG. 16). Each wheel 102 is supported by an arm 104 pivotally connected to a bracket 106 clamped to the frame member 98 and projects forwardly from the frame member 98. Each arm 104 is retractable up and down by activation of a hydraulic cylinder 108 controlled from the tractor 85 to raise and lower the applicator 80. As shown in FIGS. 10-12, the applicator 80 is about 60 feet long and distributes liquid nutrients uniformly between 25 rows R of crops. However, the applicator may be constructed shorter or longer depending on any factors, such as the size of the field, the size of the tractor and the type of crops.

As shown in FIG. 13, the wheels 102 are spaced on opposite sides of the center tongue member 87, and the wheels are spaced to go between the rows R of standing crops. Retractable wheels, such as the wheels 102, are commonly used on planters for planting seeds in fields.

The drag hose 20 extending from the hose reel 15 has an outer end portion connected by a flexible hose coupling 105, with angle limiting chains 106, to a rotatable or swivel right angle coupling 115 (FIGS. 20 & 21) to the outer end portion of an elongated tubular arm or conduit or boom 120 (FIGS. 14, 20 & 21) through which liquid flows. The opposite end portion of the boom is connected by a rotatable or swivel tubular right angle coupling 122 (FIG. 14) to one end of an elongated conduit 125 which extends inwardly from one end of the applicator 80 to a manifold or fluid distribution box 130. The inner end of the tubular arm or boom 120 is supported for rotatable movement by a swivel coupling 122 and is supported for vertical pivot movement by a flexible coupling 134 (FIG. 14). The inlet of the tubular conduit or boom 120, which is connected to the drag hose 20, is normally supported above the ground by an inclined flexible brace 136 which has an outer end pivotally connected to the boom 120 (FIG. 21). The opposite end portion of the brace 136 is pivotally connected to a rotatable bracket 139 (FIG. 14) mounted on the top end of a vertical post 140 having a bottom end portion secured to an end portion of the tool bar or frame member 98 for the wing 94 of the applicator.

The outer end portion of the tool bar or frame member 98 is supported by a vertically adjustable wheel 142 (FIG. 14). The tubular conduit or boom 120 is free to pivot or swivel on a vertical axis through an angle of over 180 degrees. The inlet end portion of the boom 120 (FIG. 21) receives liquid nutrients from the drag hose 20 through the rotatable coupling 115. The coupling has a support shoe 145 (FIG. 18) which is rigidly connected to the coupling 115 to prevent the coupling 115 from contacting the ground in the event the wing 94 of the applicator 80 tilts downwardly due to uneven ground surface.

Figure 20:
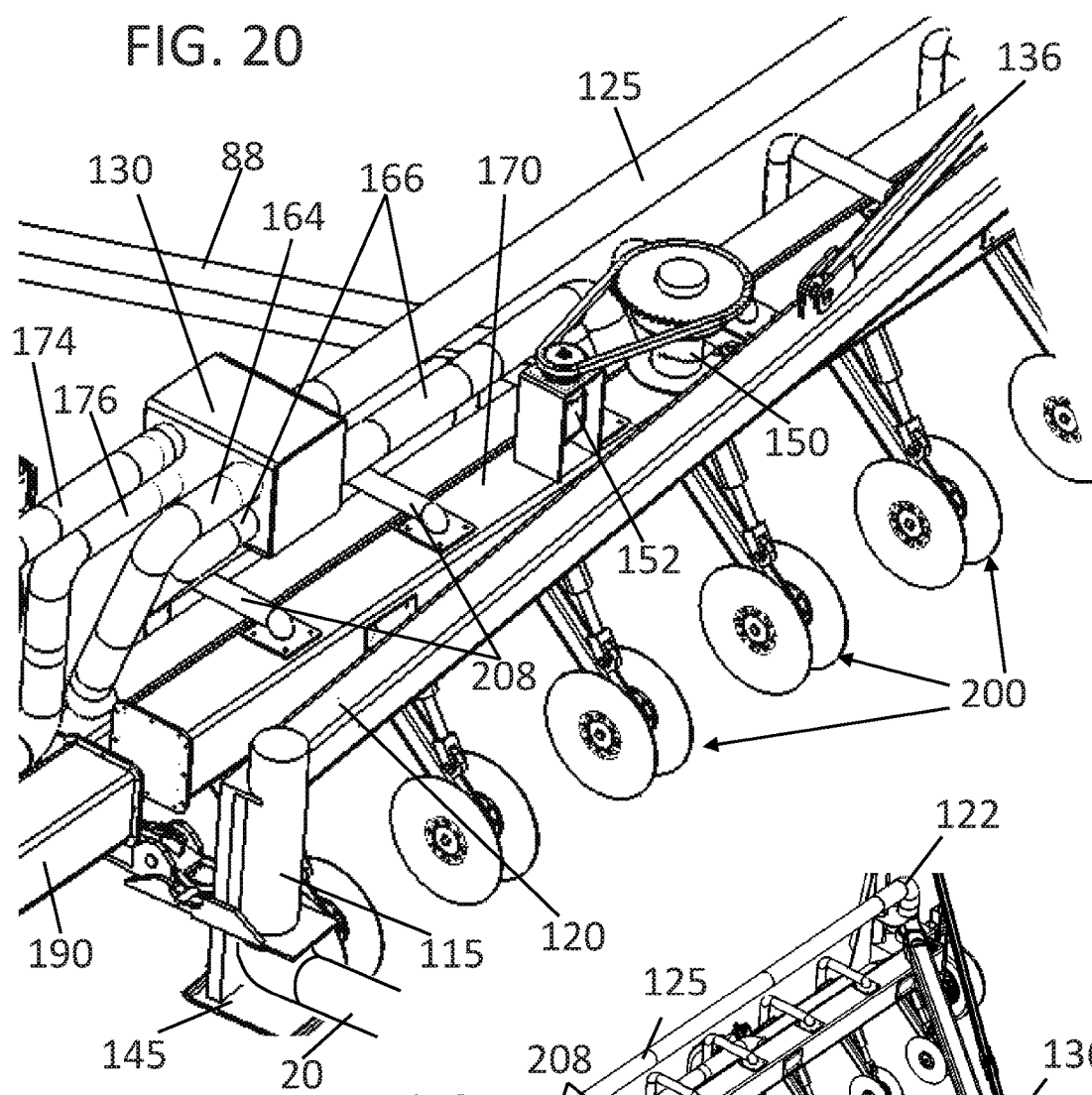
FIG. 20 is a fragmentary perspective view of the applicator before the boom connected to the drag hose is released.
Figure 21:
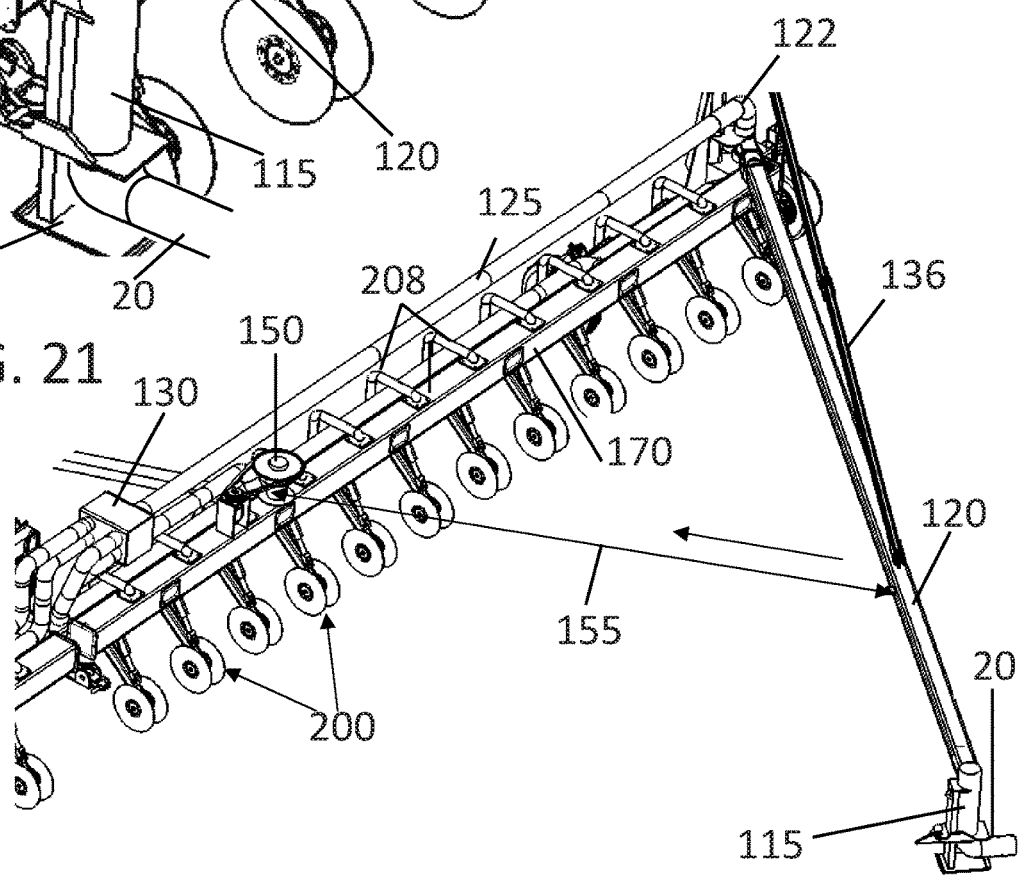
FIG. 21 is another fragmentary perspective view of the applicator with the boom and drag hose being returned to the outgoing position of the applicator.

As shown in FIGS. 20 & 21, a cable winch 150 is driven by a hydraulic motor 152, and a cable 155 extends from the winch 150 with the outer end of the cable 155 connected to the boom 120. The hydraulic motor 152 is controlled from the tractor 85 to retract the boom 120 when the tractor, applicator 80 and boom extending outwardly from the applicator (FIG. 11), make a U-turn at the inner or home end of the field for applying liquid nutrient to another group of parallel rows of standing crops growing in the field.

Referring to FIGS. 14, 20 & 21, each of the wings 92 and 94 of the applicator 80 also supports and carries a liquid distribution conduit for the liquid which is received through the drag hose 20, tubular boom 120, conduit 125 and manifold distribution box 130. Two conduits 164 and 166 (FIG. 14) supply liquid from the manifold 130 to an elongated distribution conduit or duct 170 at longitudinally spaced intervals for the right wing 94 of the applicator 80. Two conduits 174 and 176 (FIG. 14) supply liquid at longitudinally spaced intervals to an elongated conduit or duct 190 (FIG. 15) extending along the left wing 92 of the applicator 80. Preferably, the distribution ducts 170 and 190 have a square or rectangular cross-sectional configuration and may be formed from metal tubing.

Figure 17:
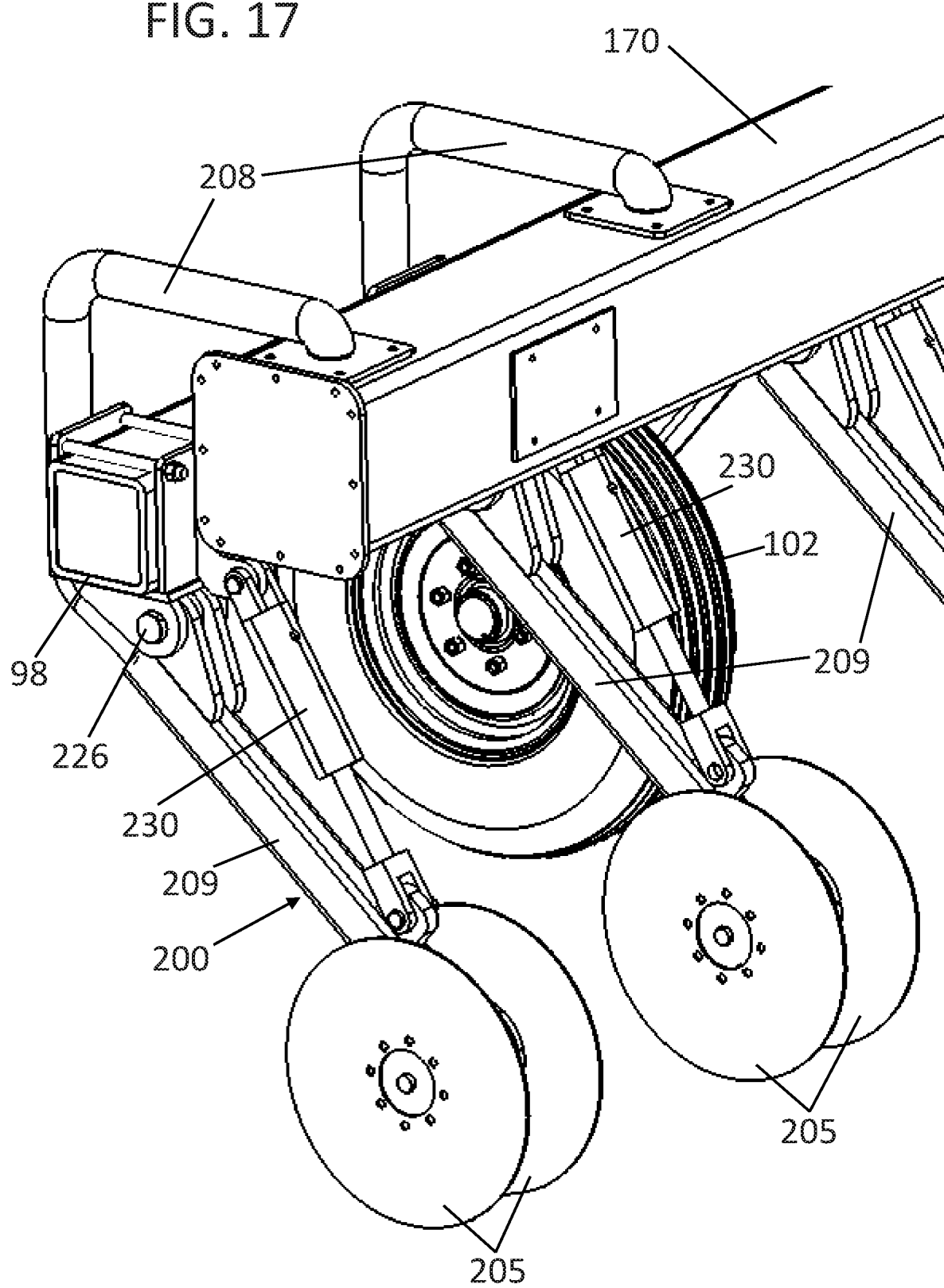
FIG. 17 is an enlarged fragmentary perspective view of a center portion of the applicator shown in FIGS. 14 and 15.
Figure 23:
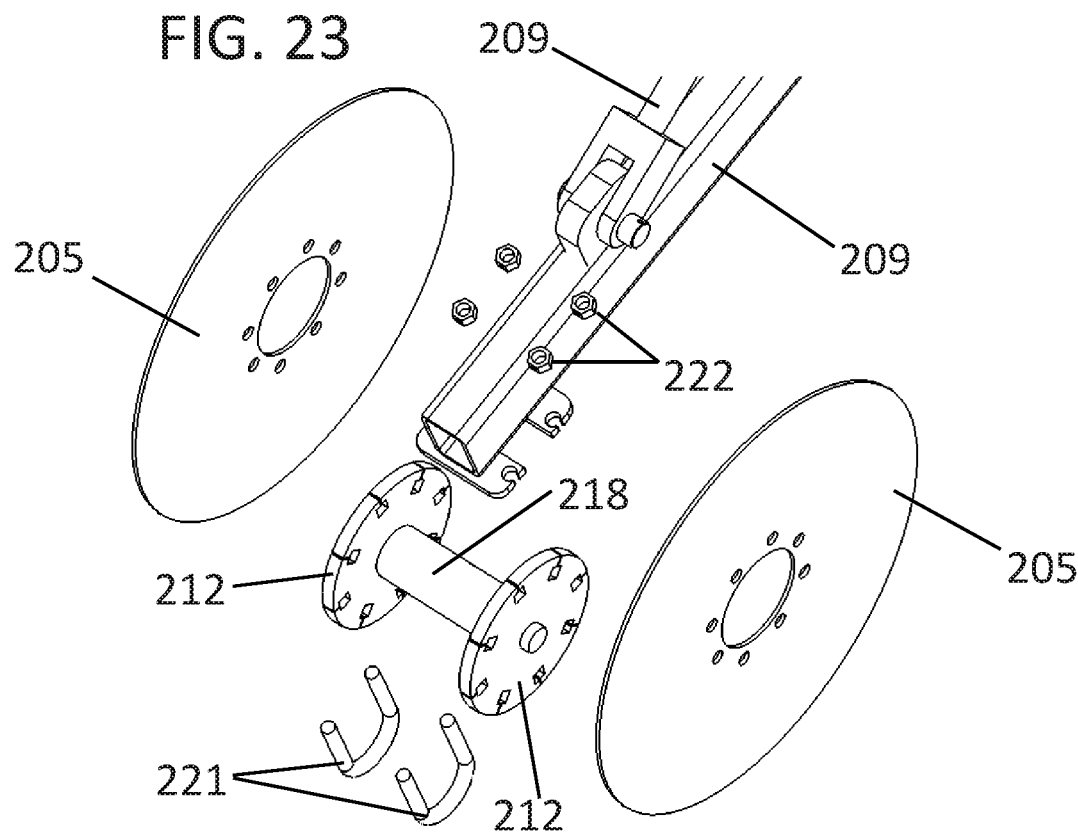
FIG. 23 is a an exploded view of a coulter assembly shown in FIG. 17.
Figure 24:
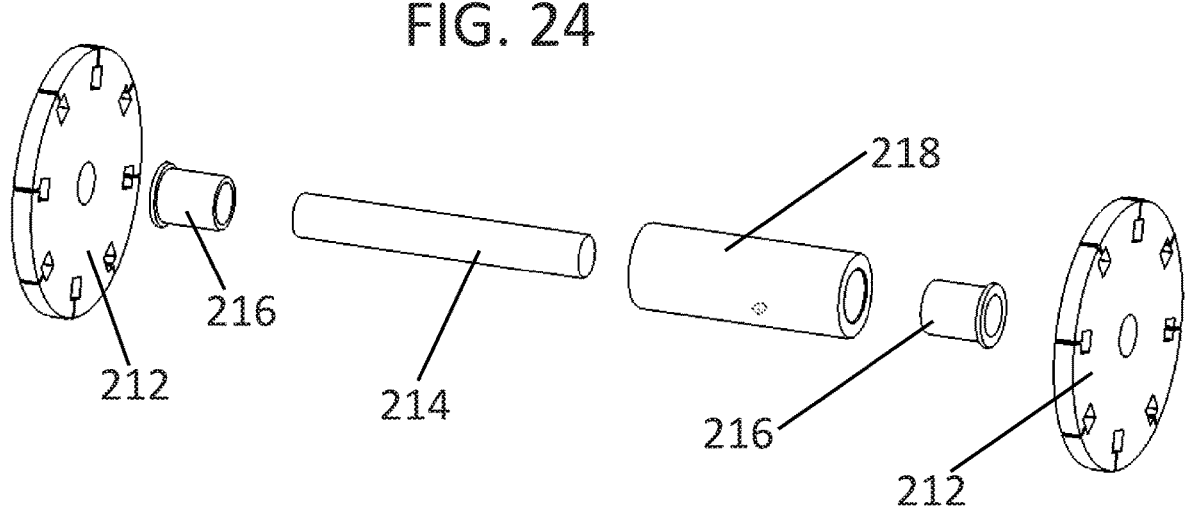
FIG. 24 is an exploded perspective view of the support for the circular coulter blades shown in FIG. 23.

Liquid distribution ducts 170 and 190 have longitudinally spaced outlets 194 (FIG. 22) on the top wall, one in-between adjacent rows R of crops. As shown in FIGS. 16 & 17, each outlet 194 supplies liquid to a corresponding dispensing coulter unit 200 and between a pair of coulter disks 205 through tubes 208 and 209. As shown in FIGS. 23 & 24, each coulter unit 200 includes a pair of circular hub plates 212 to which the disks 205 are removably attached by threaded fasteners (not shown). The hub plates 212 are rigidly connected by a center shaft 214 (FIG. 24) which receives a bushing 216 adjacent each of the hub plates 212, and the bushings 216 project into opposite ends of a center mounting tube 218. The mounting tube 218 is secured to the lower end portion of the liquid outlet tube 209 (FIG. 23) by a pair of U-bolts 221 and nuts 222. Thus the assembly of the disks 205 connected by the spool formed by the plates 212, shaft 214, bushings 216 and mounting tube 218 may be conveniently removed for quick replacement with another assembly. The disks 205 may also be removed from the plates 212 for replacement. As shown in FIG. 17, the lower discharge tube 209 of each fluid dispensing unit 200 is pivotally supported by a cross-pin 226, and a shock absorber 230 has opposite end portions pivotally connected to the outlet tube 209 and to a bracket mounted on the bottom of the corresponding liquid distribution ducts 160 and 170.

Figure 22:
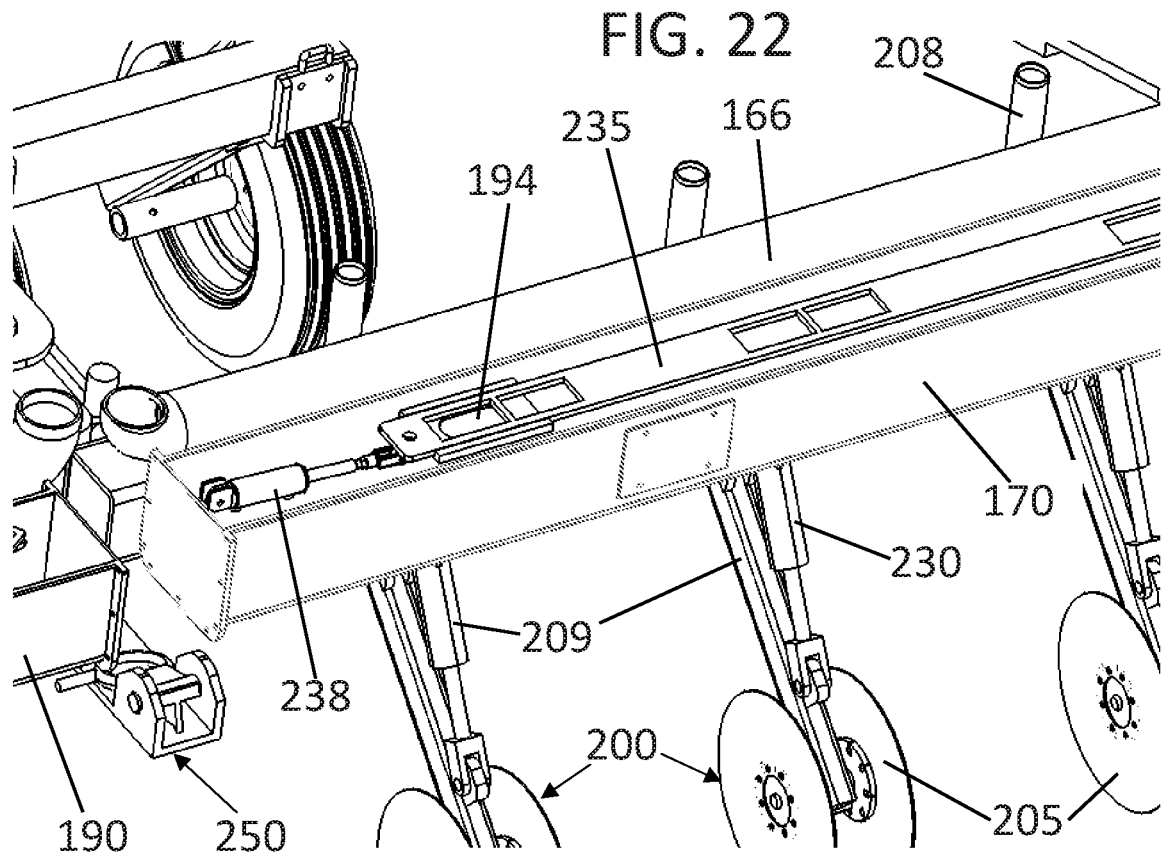
FIG. 22 is a fragmentary perspective view of the applicator with a top wall portion of the supply conduit broken away to show a mechanism for cutting or reducing solids in the flow of liquid nutrients.

Referring to FIG. 22, the liquid outlet 194 for each dispensing tube 208 for each outlet tube 209 is within the top wall of the corresponding conduit or duct 160 or 170. Under the top wall of the duct an elongated shuttle knife or blade 235 is supported. The blade 235 has an opening for each of the outlets 194, and the blade 235 is reciprocated continuously while liquid is flowing by a hydraulic cylinder 238 to reduce or crush any solids that may be flowing in a liquid.

Figure 18:
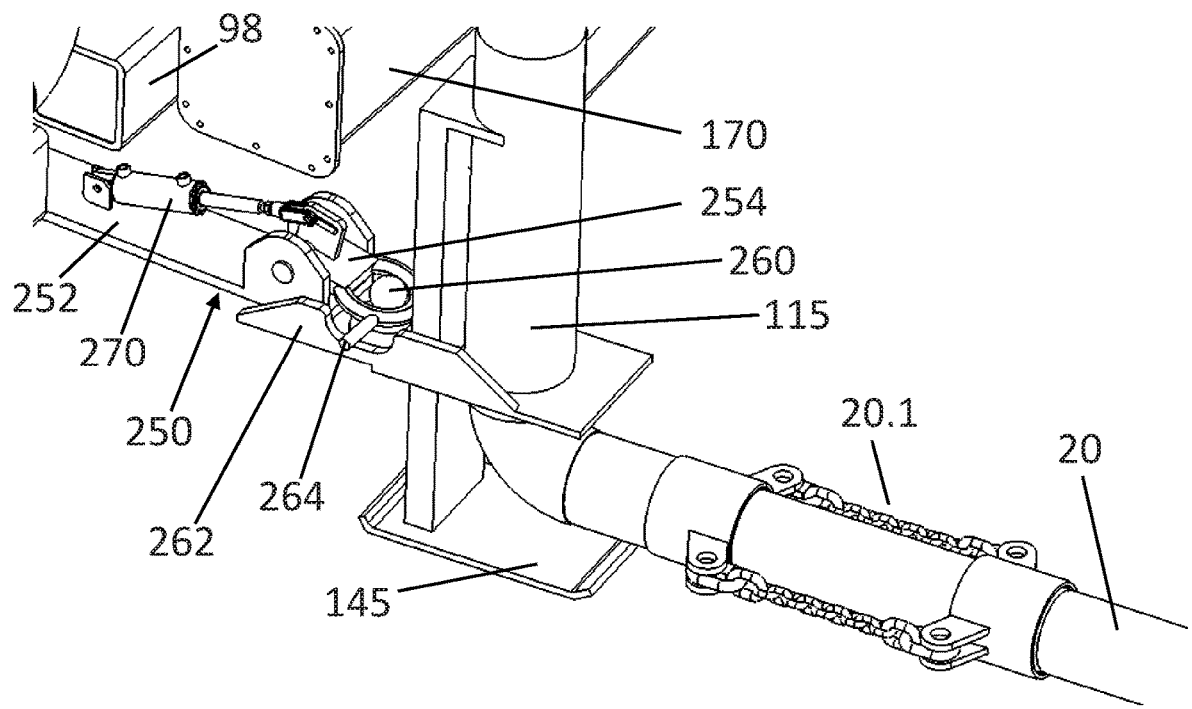
FIG. 18 is a fragmentary perspective view of a center portion of the applicator and showing the releasable coupling or hitch connection for pulling the drag hose through a flexible hose coupling.
Figure 19:
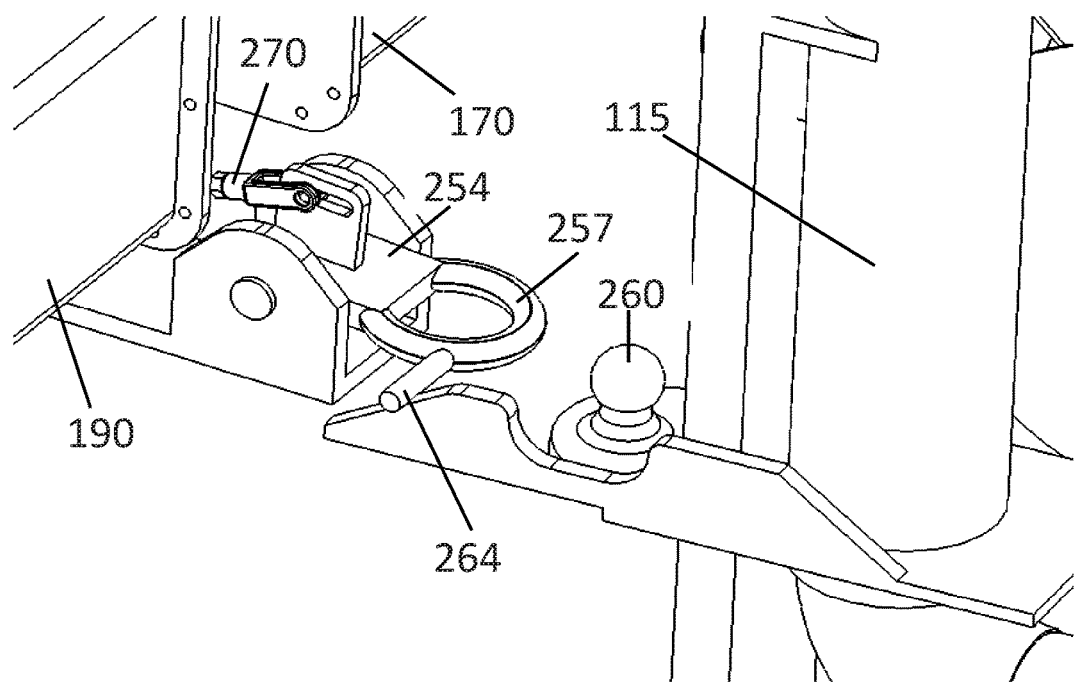
FIG. 19 is a fragmentary perspective view similar to FIG. 18 and showing the release of the drag hose and boom from the center portion of the applicator at the opposite end of the field.

Referring to FIGS. 10, 18 & 19, the drag hose 20 is pulled towards the second or opposite end of the field with the drag hose 20 aligned with the center of the tractor and through the applicator 80 in order to avoid twisting of the tractor by the substantial pulling force by the tractor which may be over thirty thousand pounds. The alignment also keeps the applicator 80 substantially normal or perpendicular to the crop rows R at all times while the tractor and applicator are moving except for making the U-turns at the opposite end of the field. Thus while the applicator 80 is being pulled by the tractor 85 towards the opposite end of the field, the rotatable or swivel coupling 115, which connects the drag hose 20 to the boom 120, is connected by a releasable hitch 250 (FIGS. 18 & 19) to the center of the applicator 80 in alignment with the center tongue member 87 aligned with the center of the tractor. The releasable hitch 250 includes a plate 252 which extends rearwardly from the tongue member 87 and through the applicator 80 (FIG. 20) between the opposing inner ends of the ducts 160 and 170. The rearward end portion of the plate 252 (FIG. 18) pivotally supports a latch plate 254 which carries a loop 257 for receiving and engaging a ball 260 secured to the forward end of the swivel coupling 115.

The coupling 115 also supports a cam plate 262 (FIG. 18) which is engaged by a pin 264 to lift the latch plate and loop 257 for engaging the ball 260 when the boom 120 swings from its extended position (FIG. 11) back to its retracted position with the aid of the cable 155 on the wench 150 to the outgoing or home position of the tractor and applicator shown in FIGS. 10 & 13. As shown in FIG. 18, when it is desired for the boom 120 to swing or pivot to the return position of the tractor and applicator (FIG. 11), the latch 250 is released by actuation of a hydraulic cylinder 270 controlled from the tractor 85 for tilting the latch plate 254 and loop 257 above the ball 260. The boom 120 may then swing to the return position (FIG. 11) at the opposite end of the field for returning the tractor and applicator back to the first end of the field.

FIGS. 25-34 show another embodiment of apparatus used for applying liquid nutrients to parallel rows R of standing crops growing in a field F. The apparatus includes an elongated applicator 300 formed by a tubular frame or toolbar 305 having a rectangular cross section and defining a longitudinally extending conduit for the nutrients. The toolbar 305 has an inner section 307 and an outer section 309 connected by a hinge 311 to provide for folding the outer section 309 upwardly above the inner section 307 for transporting the applicator.

Liquid nutrients or manure is supplied to one end of the applicator 300 through a drag hose 315 pivotally connected to an elongated tubular boom 318 by a flexible tubular coupling 319 and a vertical tubular post or conduit 322 secured to an end portion of the tubular toolbar 305 and connected to the boom 318 by a flexible tubular coupling 324. The boom 318 is pivoted between a downwardly inclined position (FIG. 25) and an upwardly projecting position (FIG. 27) by a hydraulic cylinder 326 pivotally connected to the boom 318 and to the vertical conduit 322.

The inner end portion of the toolbar 305 is supported by the tubular conduit 322 which has a lower end secured to and supported by an inverted U-shaped frame or bracket 328 of a power driven tractor or track unit 330 in the form of an endless flexible rubber track 332 extending around end wheels 334. The driven track unit 330 is commercially available, for example, by Elmers Manufacturing Ltd. and has one or more internal hydraulic motors for driving one or both wheels 334 around which the endless track 332 extends. Pressurized hydraulic fluid is supplied to the motor or motors by a hydraulic pump 340 driven by a power unit 345 carried by the applicator 300. The power unit 345 may be, for example, a self contained diesel engine connected to drive a hydraulic pump 340 which is also connected to actuate the hydraulic cylinder 326 for pivoting the tubular boom 318 between its lower and upper positions shown in FIGS. 25 and 27. The endless track unit may also be driven by an internal electric motor which receives electrical power from a power unit in the form of a generator driven by a diesel engine and carried by the applicator 300.

The liquid nutrients or manure is pumped through the drag hose 315, boom 318 and support tube 322 into one end of the toolbar 305 of the applicator 300 and is distributed between the rows of standing crops through longitudinally spaced elongated applicator units 350. Each unit 350 includes a tubular arm or conduit member 352 having an upper end pivotally connected to the toolbar 305 by a bracket 353 and also connected by a flexible tube so that the liquid manure within the toolbar 305 flows into each of the tubes 352 of the applicator units 350. Each of the tubes 352 is pivoted between a lower inclined position (FIG. 25) for application between crop rows and a generally horizontal upper retracted position for turning the applicator by actuating a hydraulic cylinder 355 with controlled hydraulic fluid from the pump 340. Preferably, the lower end portion of each applicator tube 352 supports a coulter unit 200, as described above in connection with FIGS. 15-17. The coulter units 200 are effective to loosen the ground where the liquid nutrients are inserted into the ground.

As also shown in FIGS. 25 & 26, the applicator 300 includes a second power driven tractor unit or track unit 330 which is constructed substantially the same as the first described tract unit 330. The second unit 330 supports the outer end portion of the toolbar inner section 307 by a frame 360 connected to the toolbar section 307. The hydraulic motors within the wheels 334 of the second endless track unit 330 are also powered by controlled hydraulic fluid supplied from the hydraulic pump 340 of the power unit 345.

Referring to FIGS. 28-30, the apparatus or applicator 300 described above in FIGS. 25-27 applies liquid nutrients to standing crops which may be of many different heights in parallel rows R. The drag hose 315 extends from the hose reel 15' supported by a vehicle 35', as described in U.S. Pat. No. 10,189,673. The hose 315 is connected to the flexible tubular coupling 319 of the applicator 300 and liquid nutrients are pumped into the toolbar 305 of the applicator 300. The two tractor units or track units 330 are then simultaneously operated so that the power driven endless tracts 332 cooperate to pull the drag hose 315 from the power driven unwinding hose reel 15'. The liquid pumped through the drag hose 315 is placed into the ground between the rows of crops through the applicator units 350 extending downwardly and rearwardly from the toolbar, as shown in FIG. 30. The two tractor or track units 330 are individually controlled, for example, by a GPS control system which insures that the endless tracks 332 of the track units 330 and all of the applicator units 350 are maintained between the two adjacent parallel rows R of standing crops as the applicator 300 moves from the first end of the field F1 to the opposite end of the same field F2, as shown in FIG. 28.

The applicator 300 is moved the full length of the field F1 and F2 by the two track units 330 until the applicator 300 arrives at the opposite end of the field. At this point, the track unit 330 supporting the inlet end of the tool bar 305 is essentially stopped. The inner or second track unit 330 continues to operate and pivots the applicator 300 on the vertical axis of the support tube 322 and thru 180 degrees. During the turn at the end of the field, the applicators 350 may be pivoted upwardly, as shown in FIG. 27, to minimize damage to the crops. However, liquid nutrients may continue to flowing through the applicator units 350 while the units are elevated as shown in FIG. 27 in order to apply nutrients to any crops at the end of the field.

Both of the track units 330 are then driven at the same speed while the applicator 300 returns to the first end of the field. If desired, the supply boom 318 may be pivoted upwardly during return of the applicator 300 as shown in FIGS. 29 and 31 to allow for some variation in the retraction of the drag hose 315 by the hose reel 15' and the return speed of the applicator 300.

When the applicator 300 arrives at the first end of the field in front of the hose reel 15' (FIG. 34), the applicator units 350 are pivoted upwardly while the applicator 300 turns 180 degrees. The hose reel 15' is moved axially to the next adjacent group of crop rows and the track units 330 move the applicator where the applicator 300 is perpendicular to the next group of crop rows and the track units are parallel between the rows, after which the nutrient application steps are repeated.

It is apparent from the drawings and the above description, that the system or method and apparatus for applying liquid nutrients between parallel rows of standing crops growing in a field provides a number of desirable features and advantages. For example, by keeping the drag hose 20 or 315 on the reel 15 or 15' filled with liquid nutrients, which is the heaviest component of the system, at one end of the field and only pulling the drag hose 20 or 315 through the field with the tractor 75 or 85 or track units 330 attached applicator 70 or 80 or 300, a very long drag hose may be used, and the compaction of the soil is minimized. In addition, the growing crops receive substantially all of the nutrients within the liquid at a time when the nutrients provide the greatest benefit to the crops. Also, by applying the liquid nutrients when the crops are growing and after heavy spring rains have passed, the chance of the nutrients leaching into streams adjacent the field is greatly reduced because the nutrients move through the soil into the growing crops when the crops are best able to absorb and utilize the nutrients.

The system for applying the liquid nutrients in accordance with the invention also results in minimizing damage to the standing crops, including minimal damage in the perpendicular end rows of crops. The apparatus also has components which provide desirable features, such as, for example, the construction of the coulter unit 200 including the assembly of the disks 205 and the support of the disks as described using the components of FIG. 24. Rapid replacement of the coulter units can save substantial time in the field.

The applicator system of FIGS. 25-34 also provides additional desirable advantages. For example, the system can be made autonomous with remote controls for the track units 330, the power plant 345, the hydraulic pump, motor and cylinders as well as operation of the vehicle 35' and axial movement of the hose reel 15'. This reduces the labor involved in operating the equipment for applying liquid nutrients. In addition, the system allows the application to row crops of any height, which greatly extends the time period or window for applying nutrients to growing crops. The self-propelled applicator with the narrow track units 330 not only reduces labor but also uses less fuel.

While the methods and forms of apparatus herein described constitute embodiments of the invention, it is to be understood that the invention is not limited to precise methods and forms of apparatus described, and that changes made therein without departing from the scope of the invention as defined in the appended claims.

What is claimed is:

1. Apparatus adapted for applying liquid nutrients to parallel rows of standing crops growing in a field with minimal damage to the crops, the apparatus comprising an elongated drag hose wound onto a power driven hose reel with the drag hose having an inlet and an outlet, a vehicle supporting the hose reel for axial movement of the hose reel adjacent a first end of the field and perpendicular to the rows of crops, the drag hose extending from the hose reel to an elongated applicator connected to longitudinally spaced endless track units positioned to move between the rows of standing crops and with the applicator extending transversely relative to the track units, the drag hose extending longitudinally from the hose reel between two of the parallel rows of crops and connected to a liquid distribution system of the applicator with the distribution system having outlets located between the rows of crops, a pump for pumping the liquid nutrients from a supply source into the inlet of the drag hose supported by the hose reel, the track units connected to pull the drag hose from the hose reel and between the two rows of crops while the applicator and distribution system supply the liquid nutrients to a first group of parallel rows of standing crops, the applicator being operable to turn at an opposite second end of the field while the applicator is elevated relative to the crops for positioning the applicator extending transversely to a second group of parallel rows of crops, the liquid nutrients being supplied through the drag hose and distribution system to the second group of rows of crops while the track units and applicator return to the first end of the field, the drag hose being maintained between the two rows of crops with the applicator extending transversely relative to the track units while the drag hose is being rewound onto the hose reel synchronized with the return of the track units and applicator, the vehicle is operable to move the hose reel axially to a third group of rows of crops where the track units and applicator are positioned to apply the liquid nutrients to the third group of the parallel rows of crops, a power unit connected to the applicator to provide power for driving the endless track units, and a boom pivotally connected to the drag hose and to the applicator, and a power actuator operated by the power unit and connected to move the boom between a lower position and an upper position for raising and lowering an end portion of the drag hose.

2. Apparatus as defined in claim 1 wherein the distribution system on the applicator includes a plurality of longitudinally spaced liquid nutrient supply tubes movable between a downwardly projecting lower position and an upper retracted position, and power actuators operated by the power unit and connected to move the supply tubes between the lower and upper positions.

3. Apparatus adapted for applying liquid nutrients to parallel rows of standing crops growing in a field with minimal damage to the crops, the apparatus comprising an elongated drag hose wound onto a power driven hose reel with the drag hose having an inlet and an outlet, a vehicle supporting the hose reel for axial movement of the hose reel adjacent a first end of the field and perpendicular to the rows of crops, the drag hose extending from the hose reel to one end portion of an elongated applicator by a vertically movable boom, a set of longitudinally spaced tractor units connected to the applicator and positioned to move between the rows of standing crops and with the applicator extending transversely relative to the tractor units, the drag hose extending longitudinally from the hose reel between two of the parallel rows of crops and connected to a liquid distribution system of the applicator with the distribution system having pivotally supported arms with outlets located between the rows of crops, at least one tractor unit positioned between two of the arms with the outlets, a pump for pumping the liquid nutrients from a supply source into the inlet of the drag hose supported by the hose reel, the tractor units connected to pull the drag hose from the hose reel and between the two rows of crops while the applicator and distribution system supply the liquid nutrients to a first group of parallel rows of standing crops, the applicator being operable to turn at an opposite second end of the field while the arms of the applicator are elevated relative to the crops for positioning the applicator extending transversely to a second group of parallel rows of crops, the liquid nutrients being supplied through the drag hose and distribution system to the second group of rows of crops while the tractor units and applicator return to the first end of the field, the drag hose being maintained between the two rows of crops with the applicator extending transversely relative to the tractor units while the drag hose is being rewound onto the hose reel synchronized with the return of the tractor units and applicator, and the vehicle is operable to move the hose reel axially to a third group of rows of crops where the tractor units and applicator are positioned to apply the liquid nutrients to the third group of the parallel rows of crops.

4. Apparatus as defined in claim 3 and including a power unit connected to the applicator to provide power for driving the tractor units.

5. Apparatus as defined in claim 3 wherein the distribution system on the applicator includes a plurality of longitudinally spaced liquid nutrient supply tubes movable between a downwardly projecting lower position and an upper retracted position, and power actuators operated by a power unit and connected to move the supply tubes between the lower and upper positions.

6. Apparatus as defined in claim 3 wherein the boom is pivotally connected to the drag hose and to one end portion of the applicator, and a power actuator connected to move the boom between a lower position and an upper position for raising and lowering an end portion of the drag hose.

7. Apparatus as defined in claim 3 wherein an end portion of the applicator is connected to one of the tractor units for rotation on a substantially vertical axis adjacent the one tractor unit.

8. Apparatus as defined in claim 3 and including a power unit supported by the applicator above the tractor units and comprising an engine driving a hydraulic pump connected to a hydraulic motor within each of the tractor units for driving the tractor units.

9. Apparatus as defined in claim 3 and including a power unit supported by the applicator above the tractor units and comprising an engine driving an electric generator connected to an electric motor within each of the tractor units for driving the tractor units.

* * * * *